US009336087B2

(12) United States Patent
Callaway et al.

(10) Patent No.: US 9,336,087 B2
(45) Date of Patent: *May 10, 2016

(54) MATCH SERVER FOR A FINANCIAL EXCHANGE HAVING FAULT TOLERANT OPERATION

(71) Applicant: Chicago Mercantile Exchange Inc., Chicago, IL (US)

(72) Inventors: Paul J. Callaway, Chicago, IL (US); Robert C. Hagemann, III, Chicago, IL (US); Zuber Shethwala, Hoffman Estates, IL (US); Troy Reece, South Elgin, IL (US); Paul A. Bauerschmidt, Glenview, IL (US); Enrico Ferrari, Farmington Hills, MI (US); Barry L. Galster, Chicago, IL (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 171 days.

This patent is subject to a terminal disclaimer.

(21) Appl. No.: 14/159,726

(22) Filed: Jan. 21, 2014

(65) Prior Publication Data

US 2014/0201563 A1  Jul. 17, 2014

Related U.S. Application Data

(63) Continuation of application No. 13/852,679, filed on Mar. 28, 2013, now Pat. No. 8,656,210, which is a continuation of application No. 13/227,774, filed on Sep. 8, 2011, now Pat. No. 8,433,945, which is a
(Continued)

(51) Int. Cl.
*G06F 11/00* (2006.01)
*G06F 11/14* (2006.01)
(Continued)

(52) U.S. Cl.
CPC ........ *G06F 11/1412* (2013.01); *G06F 11/1641* (2013.01); *G06F 11/1687* (2013.01);
(Continued)

(58) Field of Classification Search
CPC ............ G06F 11/0757; G06F 11/1412; G06F 11/1641; G06F 11/1687; G06F 11/1695; G06F 11/2028; G06F 11/2038; G06F 11/2046; G06F 11/2097; G06Q 40/04
See application file for complete search history.

(56) References Cited

U.S. PATENT DOCUMENTS

| 5,088,021 A | 2/1992 | McLaughlin et al. |
| 5,452,443 A | 9/1995 | Oyamada et al. |

(Continued)

FOREIGN PATENT DOCUMENTS

WO   03081430 A2   10/2003

OTHER PUBLICATIONS

European Search Report EP 7799438.2.
(Continued)

*Primary Examiner* — Marc Duncan
(74) *Attorney, Agent, or Firm* — Lempia Summerfield Katz LLC

(57) ABSTRACT

Fault tolerant operation is disclosed for a primary match server of a financial exchange using an active copy-cat instance, a.k.a. backup match server, that mirrors operations in the primary match server, but only after those operations have successfully completed in the primary match server. Fault tolerant logic monitors inputs and outputs of the primary match server and gates those inputs to the backup match server once a given input has been processed. The outputs of the backup match server are then compared with the outputs of the primary match server to ensure correct operation. The disclosed embodiments further relate to fault tolerant failover mechanism allowing the backup match server to take over for the primary match server in a fault situation wherein the primary and backup match servers are loosely coupled, i.e. they need not be aware that they are operating in a fault tolerant environment. As such, the primary match server need not be specifically designed or programmed to interact with the fault tolerant mechanisms. Instead, the primary match server need only be designed to adhere to specific basic operating guidelines and shut itself down when it cannot do so. By externally controlling the ability of the primary match server to successfully adhere to its operating guidelines, the fault tolerant mechanisms of the disclosed embodiments can recognize error conditions and easily failover from the primary match server to the backup match server.

20 Claims, 14 Drawing Sheets

Related U.S. Application Data continuation of application No. 12/560,029, filed on Sep. 15, 2009, now Pat. No. 8,041,985, which is a continuation-in-part of application No. 12/188,474, filed on Aug. 8, 2008, now Pat. No. 7,694,170, which is a continuation of application No. 11/502,851, filed on Aug. 11, 2006, now Pat. No. 7,434,096.

(51) Int. Cl.
  *G06F 11/16* (2006.01)
  *G06F 11/20* (2006.01)
  *G06Q 40/04* (2012.01)

(52) U.S. Cl.
  CPC ........ *G06F11/1695* (2013.01); *G06F 11/2028* (2013.01); *G06F 11/2038* (2013.01); *G06F 11/2097* (2013.01); *G06Q 40/04* (2013.01); *G06F 11/2046* (2013.01)

(56) References Cited

U.S. PATENT DOCUMENTS

| | | | |
|---|---|---|---|
| 6,169,726 B1 | 1/2001 | Dempsey et al. | |
| 6,199,171 B1 | 3/2001 | Bossen et al. | |
| 6,393,582 B1 | 5/2002 | Klecka et al. | |
| 6,625,751 B1 | 9/2003 | Starovic et al. | |
| 6,954,877 B2 | 10/2005 | Earl et al. | |
| 6,978,396 B2 | 12/2005 | Ruuth et al. | |
| 7,039,827 B2 | 5/2006 | Meyer et al. | |
| 7,139,939 B2 | 11/2006 | Greenlee et al. | |
| 7,225,355 B2 | 5/2007 | Yamazaki et al. | |
| 8,656,210 B2 * | 2/2014 | Callaway ............ | G06F 11/1641 714/4.1 |
| 2002/0026400 A1 | 2/2002 | Narayan et al. | |
| 2003/0225760 A1 | 12/2003 | Ruuth et al. | |
| 2004/0073836 A1 | 4/2004 | Shimada | |
| 2004/0199812 A1 | 10/2004 | Earl et al. | |
| 2004/0243503 A1 | 12/2004 | Eng et al. | |
| 2004/0260972 A1 | 12/2004 | Ji et al. | |
| 2005/0144513 A1 | 6/2005 | Nakamura et al. | |
| 2006/0080353 A1 | 4/2006 | Miloushev et al. | |
| 2006/0107108 A1 | 5/2006 | Geng et al. | |
| 2006/0112219 A1 | 5/2006 | Chawla et al. | |
| 2006/0117212 A1 | 6/2006 | Meyer et al. | |
| 2006/0129759 A1 | 6/2006 | Bartlett et al. | |
| 2007/0061383 A1 | 3/2007 | Ozawa et al. | |
| 2007/0124342 A1 | 5/2007 | Yamamoto et al. | |
| 2008/0034251 A1 * | 2/2008 | Singhal ............... | G06F 11/2097 714/5.1 |
| 2008/0126832 A1 | 5/2008 | Morosan et al. | |
| 2008/0126833 A1 | 5/2008 | Callaway et al. | |
| 2008/0126853 A1 | 5/2008 | Callaway et al. | |
| 2009/0327519 A1 * | 12/2009 | Thiel ................... | G06F 11/2025 709/239 |
| 2012/0030508 A1 * | 2/2012 | Vivian ................ | G06F 11/2097 714/6.3 |

OTHER PUBLICATIONS

European Search Report EP 7840601.4.
Extended European Search Report from EP 10817633.0, dated Feb. 14, 2013.
Fraga et al., A Programming Model for Real-Time Applications in Open Distributed Systems, Aug. 28-30, 1995, pp. 104-111, Proceedings of the Fifth IEE Computer Society Workshop of Future Trends ISBN: 0-8186-7125-4.
International Search Report PCT/10/46277.
International Search Report PCT/US2007/73141.
International Search Report PCT/US2007/74810.
Office Action from related European Application No. 10817633.0, Sep. 20, 2013, EP.
Patent Examination Report No. 1, from related Australian Application No. 2010295938, Apr. 12, 2013, AU.

* cited by examiner (cont'd to Fig. 10 B)

MATCH SERVER FOR A FINANCIAL EXCHANGE HAVING FAULT TOLERANT OPERATION

REFERENCE TO RELATED APPLICATIONS

This application is a continuation under 37 C.F.R. §1.53(b) of U.S. patent application Ser. No. 13/852,679 filed Mar. 28, 2013 now U.S. Pat. No. 8,656,210, which is a continuation under 37 C.F.R. §1.53(b) of U.S. patent application Ser. No. 13/227,774 filed Sep. 8, 2011 now U.S. Pat. No. 8,433,945, which is a continuation under 37 C.F.R. §1.53(b) of U.S. patent application Ser. No. 12/560,029 filed Sep. 15, 2009 now U.S. Pat. No. 8,041,985, which is a continuation-in-part under 37 C.F.R. §1.53(b) of U.S. patent application Ser. No. 12/188,474 filed Aug. 8, 2008 now U.S. Pat. No. 7,694,170, which is a continuation under 37 C.F.R. §1.53(b) of U.S. patent application Ser. No. 11/502,851 filed Aug. 11, 2006 now U.S. Pat. No. 7,434,096, the entire disclosures of which are hereby incorporated by reference.

BACKGROUND

Fault Tolerance is generally regarded as the ability to mask, or recover from, erroneous conditions in a system once an error has been detected. Fault tolerance is typically required for mission critical systems/applications. Mission critical typically refers to any indispensable operation that cannot tolerate intervention, compromise or shutdown during the performance of its critical function, e.g. any computer process that cannot fail during normal business hours. Exemplary mission critical environments include business-essential process control, finance, health, safety and security. These environments typically monitor, store, support and communicate data that cannot be lost or corrupted without compromising their core function.

One exemplary environment where fault tolerance is essential is in financial markets, and in particular, electronic financial exchanges. The systems that implement an electronic exchange receive and match orders and otherwise consummate trades so as to implement the marketplace and facilitate the exchanges therein. Consistent reliable operation is critical to ensuring market stability, reliability and acceptance.

Fault-tolerant typically describes a computer system or component designed so that, in the event that a component fails, a backup component or procedure can take its place with substantially little or no loss of service. Fault tolerance may be provided with software, or embedded in hardware, or provided by some combination. For example, in a software implementation, the operating system may provide an interface that allows a programmer to "checkpoint" critical data at pre-determined points within a transaction. In a hardware implementation, the programmer need not be aware of the fault-tolerant capabilities of the machine. For example, at a hardware level, fault tolerance may be achieved by duplexing each hardware component, e.g. disks are mirrored, multiple processors are "lock-stepped" together and their outputs are compared for correctness, etc. When an anomaly occurs, the faulty component is determined and taken out of service, but the machine continues to function as usual.

The level of fault tolerance that is required is typically defined by the needs of the system requirements, i.e. specifications that clearly state acceptable behavior upon error, e.g. do errors need to be detected and corrected or merely detected, and how quickly must such actions be taken?

One method of providing fault tolerance to a system is to add redundancy to one or more of the critical components of the system. Redundant describes computer or network system components, such as fans, hard disk drives, servers, operating systems, switches, and/or telecommunication links that are installed to back up primary resources in case they fail. Three types of redundancy schemes are commonly used for this purpose:

One-for-N (1:N)—There is one standby component for every N active component.

One-for-one (1:1)—There is a standby component for each active component.

One-plus-one (1+1)—This is similar to the one-for-one scheme except that in the case of one-plus-one, traffic is transmitted simultaneously on both active and standby components. (Traffic is generally ignored on the standby.) An example of one-plus-one redundancy is the 1+1 SONET/SDH APS scheme that avoids loss of data traffic caused by link failure.

When providing redundant operation for processing components, voting logic may be used to compare the results of the redundant logic and choose which component is correct. For example, in Triple Mode Redundancy, three redundant components may be provided wherein if the result of one component fails to match the other two, which match each other, the ultimate result will be that of the two components that matched.

A well-known example of a redundant system is the redundant array of independent disks ("RAID"). RAID (originally redundant array of inexpensive disks) is a way of storing the same data in different places (thus, redundantly) on multiple hard disks. By placing data on multiple disks, I/O (input/output) operations can overlap in a balanced way, improving performance. Since multiple disks increases the mean time between failures (MTBF), storing data redundantly also increases fault tolerance. A RAID appears to the operating system to be a single logical hard disk. RAID employs the technique of disk striping, which involves partitioning each drive's storage space into units ranging from a sector (512 bytes) up to several megabytes. The stripes of all the disks are interleaved and addressed in order. In a single-user system where large records, such as medical or other scientific images, are stored, the stripes are typically set up to be small (perhaps 512 bytes) so that a single record spans all disks and can be accessed quickly by reading all disks at the same time. In a multi-user system, better performance requires establishing a stripe wide enough to hold the typical or maximum size record. This allows overlapped disk I/O across drives.

There are at least nine types of RAID plus a non-redundant array (RAID-0):

RAID-0: This technique has striping but no redundancy of data. It offers the best performance but no fault-tolerance.

RAID-1: This type is also known as disk mirroring and consists of at least two drives that duplicate the storage of data. There is no striping. Read performance is improved since either disk can be read at the same time. Write performance is the same as for single disk storage. RAID-1 provides the best performance and the best fault-tolerance in a multi-user system.

RAID-2: This type uses striping across disks with some disks storing error checking and correcting (ECC) information. It has no advantage over RAID-3.

RAID-3: This type uses striping and dedicates one drive to storing parity information. The embedded error checking (ECC) information is used to detect errors. Data recovery is accomplished by calculating the exclusive OR (XOR) of the information recorded on the other drives. Since an I/O operation addresses all drives at the same time, RAID-3 cannot overlap I/O. For this reason, RAID-3 is best for single-user systems with long record applications.

RAID-4: This type uses large stripes, which means you can read records from any single drive. This allows you to take advantage of overlapped I/O for read operations. Since all write operations have to update the parity drive, no I/O overlapping is possible. RAID-4 offers no advantage over RAID-5.

RAID-5: This type includes a rotating parity array, thus addressing the write limitation in RAID-4. Thus, all read and write operations can be overlapped. RAID-5 stores parity information but not redundant data (but parity information can be used to reconstruct data). RAID-5 requires at least three and usually five disks for the array. It's best for multi-user systems in which performance is not critical or which do few write operations.

RAID-6: This type is similar to RAID-5 but includes a second parity scheme that is distributed across different drives and thus offers extremely high fault- and drive-failure tolerance.

RAID-7: This type includes a real-time embedded operating system as a controller, caching via a high-speed bus, and other characteristics of a stand-alone computer.

RAID-10: Combining RAID-0 and RAID-1 is often referred to as RAID-10, which offers higher performance than RAID-1 but at much higher cost. There are two subtypes: In RAID-0+1, data is organized as stripes across multiple disks, and then the striped disk sets are mirrored. In RAID-1+0, the data is mirrored and the mirrors are striped.

RAID-50 (or RAID-5+0): This type consists of a series of RAID-5 groups and striped in RAID-0 fashion to improve RAID-5 performance without reducing data protection.

RAID-53 (or RAID-5+3): This type uses striping (in RAID-0 style) for RAID-3's virtual disk blocks. This offers higher performance than RAID-3 but at much higher cost.

RAID-S (also known as Parity RAID): This is an alternate, proprietary method for striped parity RAID from EMC Symmetrix that is no longer in use on current equipment. It appears to be similar to RAID-5 with some performance enhancements as well as the enhancements that come from having a high-speed disk cache on the disk array.

Similar to RAID, RAIN (also called channel bonding, redundant array of independent nodes, reliable array of independent nodes, or random array of independent nodes) is a cluster of nodes connected in a network topology with multiple interfaces and redundant storage. RAIN is used to increase fault tolerance. It is an implementation of RAID across nodes instead of across disk arrays. RAIN can provide fully automated data recovery in a local area network (LAN) or wide area network (WAN) even if multiple nodes fail. A browser-based, centralized, secure management interface facilitates monitoring and configuration from a single location. There is no limit to the number of nodes that can exist in a RAIN cluster. New nodes can be added, and maintenance conducted, without incurring network downtime. RAIN originated in a research project for computing in outer space at the California Institute of Technology (Caltech), the Jet Propulsion Laboratory (JPL), and the Defense Advanced Research Projects Agency (DARPA) in the United States. The researchers were looking at distributed computing models for data storage that could be built using off-the-shelf components.

The idea for RAIN came from RAID (redundant array of independent disks) technology. RAID partitions data among a set of hard drives in a single system. RAIN partitions storage space across multiple nodes in a network. Partitioning of storage is called disk striping. Several patents have been granted for various proprietary versions of RAIN.

In databases and processing systems, especially stateful processing systems which store or accumulate state as they continue to process or transact, redundancy presents additional complications of ensuring that the redundant component is synchronized with the primary component so as to be ready to take over should the primary component fail.

A Hot Standby (HS) is a mechanism which supports non-disruptive failover of database server system maintaining system availability, i.e. its ability to provide desired service when required, by a second server system ready to take over when the main system is unavailable. In the hot standby replication scheme servers usually have two different roles, the first of which is a primary server and the second a secondary (backup, slave) server. The hot standby configuration provides a way for a secondary database to automatically maintain a mirror image of the primary database. The secondary database on the secondary server is usually of read-only type and it is logically identical to the primary database on the primary server. In case a failure occurs in the primary server, the secondary server can take over and assume the role of a new primary server.

There are several methods for achieving high availability in computer systems that contain databases. One known way to carry out continuous hot standby is to mirror the entire system, i.e. databases and the applications that use the database. All operations of the system are performed on both applications of the system. The applications write each transaction to their respective databases so both systems are completely synchronized at all times. To ensure that the applications and their databases are mutually in synchronization, typically a mechanism called application checkpointing is used. After each executed operation, the application ensures by some means that the other application has executed the same operation. In other words, the secondary database in association with the secondary application precisely mirrors the primary database and application. The application level mirroring is a good choice for real-time applications where everything, including the application processes need to be fault tolerant.

The primary process actually performs the work and periodically synchronizes a backup process with the primary process using checkpointing techniques. With prior known checkpointing techniques, the primary sends messages that contain information about changes in the state of the primary process to the backup process. Immediately after each checkpoint, the primary and backup processes are in the same state.

In other prior known checkpointing methods, distinctions between operations that change state (such as write operations) and operations that do not change the state (such as read operations) are not made, and all operations are checkpointed to the backup process. Such a system is shown in U.S. Pat. No. 4,590,554 (Glazer—Parallel Computer Systems) where all inputs to the primary are provided via messages and all messages sent to the primary are made available to the secondary or backup, essentially allowing the backup to "listen in on" the primary's messages. Another such system is described in and U.S. Pat. No. 5,363,503 (Gleeson—Unisys Corporation) where checkpointing is provided as described in U.S. Pat. No. 4,590,554.

Other prior art, such as that shown in U.S. Pat. No. 4,228,496 (Katzman—Tandem Computers), describe that the primary receives a message, processes the message, and produces data. The produced data is stored in the primary's data space thereby changing the primary's data space. The change in the primary's data space causes a checkpointing operation of the data space to be made available to the backup. Thus, there is frequent copying of the primary's data space to the backup's data space, which uses a significant amount of time and memory for transferring the state of the primary to the backup. It may also result in the interruption of service upon failure of the primary. The overhead for such checkpointing methods can have considerable performance penalties.

Other prior art examples attempt to update only portions of the state of the primary that has changed since the previous update, but use complex memory and data management schemes. In others as shown in U.S. Pat. No. 5,621,885 (Del Vigna—Tandem Computers) the primary and backup, which run on top of a fault tolerant runtime support layer (that is, an interface between the application program and operating system) are resident in memory and accessible by both the primary and backup CPUs used in the described fault-tolerance model. The primary and backup processes perform the same calculations because they include the same code.

U.S. Pat. No. 6,954,877 discloses a system and method for checkpointing a primary computer process to a backup computer process such that if there is a failure of a primary process, the backup process can takeover without interruption. In addition, upgrades to different version of software or equipment can take place without interruption. A lightweight checkpointing method is disclosed that allows checkpointing of only external requests or messages that change the state of the service instance, thereby reducing the overhead and performance penalties.

In particular, a computing system provides a mechanism for checkpointing in a fault-tolerant service. The service is made fault tolerant by using a process pair; the primary process performs the work officially, while one or more backup processes provide a logical equivalent that can be used in the event of failure. The primary and backup are allowed to be logically equivalent at any given point in time, but may be internally different physically or in their implementation.

Implementation of checkpointing mechanisms requires lots of work from the application programmers as the application checkpointing mechanism is a difficult task to implement. Another method for processing hot standby replication operations is to create a transaction log of the operations of a transaction run in the primary server, transfer the log to the secondary server and run serially the transferred transaction log on the secondary server. This log is a record of all data items that have been inserted, deleted or updated as a result of processing and manipulation of the data within the transaction. The data needs to be written to both databases before it can be committed in either of the databases. This ensures that data is safely stored in the secondary server before the primary server sends acknowledgement of successful commit to the client application. An example of this kind of data mirroring system is described in the U.S. Pat. No. 6,324,654 where "A primary mirror daemon on a local computer system monitors the writelog device (redundant data storage or memory device) for data updates and feeds the data over a network in the same order in which it is stored to a receiving remote mirror daemon on a remote computer system, which in turns commits the data updates to a mirror device." In a situation of a failure recovery these primary and secondary mirror daemons transfer the log to the secondary node where the log is run just as it was in the primary node. The replicated operations are run serially in the secondary node which slows down processing speed and hence reduces overall performance.

Still another mechanism for achieving database fault tolerance is to have an application connect to two databases. Whenever the application executes an application function, it commits the related data changes to both servers. To ensure that the transaction is committed in both databases, the application typically needs to use so called two-phase commit protocol to ensure the success of the transaction in both databases. If the transaction fails in either of the databases, it needs to fail also in the other databases. Using two-phase commit protocol needs to be done in the application which makes the application code more complex. Moreover, distributed transactions are quite common cause to performance problems as the transaction cannot be completed before both databases acknowledge the transaction commit. In this scenario, recovery from error situations can also be very difficult.

Still another way for processing hot standby replication operations is to copy the transaction rows to the secondary node after they have been committed on the primary node. This method is a mere copying procedure where transactions are run serially in the secondary node. This method is known as asynchronous data replication. This method is not always suitable for real-time database mirroring because all transactions of the primary database may not yet be executed in the secondary database when the fail-over from primary to secondary happens.

Many database servers are able to execute concurrent transactions in parallel in an efficient manner. For example, the server may execute different transactions on different processors of a multi-processor computer. This way, the processing power of the database server can be scaled up by adding processors to the computer. Moreover, parallel execution of transactions avoid blocking effect of serially executed long-running transactions such as creating an index to a large table. To ensure integrity of the database, some concurrency control method such as locking or data versioning needs to be used to manage access to data that is shared between transactions. If two transactions try to have write access to the same data item simultaneously and versioning concurrency control is in use, the server either returns a "concurrency conflict" error to one of the transactions and the application needs to re-attempt executing the transaction later. If locking concurrency control is in use, the server makes one of the transactions wait until the locked resources are released. However, in this scenario it is possible that a deadlock condition, where two transactions lock resources from each other, occurs and one of the transactions must be killed to clear the deadlock condition. The application that tried to execute the killed transaction, must handle the error e.g. by re-attempting execution of the transaction.

These concurrency control methods known in the prior art are suitable for use in the primary server of the Hot Standby database configuration to manage concurrent online transactions of client applications but they cannot be applied in the secondary server of the system. This is because the concurrency conflict errors cannot be allowed in the secondary server as there is no way to properly handle these error conditions. Because of the absence of a proper Hot Standby concurrency control method, in the prior art replicated hot standby operations are run substantially in a serial form in the secondary node. Because operations cannot be executed in parallel, it is difficult to improve secondary server's performance without raising problems in data integrity and transaction consistency. Essentially, a mechanism is needed that allows transactions to run parallel but that ensures that transactions are not started too early and they are committed before dependent transactions are started.

U.S. Pat. No. 6,978,396 discloses a mechanism to run transaction operations originating from a primary server used to replicate data in parallel in a secondary server and relates to running concurrent or parallel operations in a secondary server for redundancy, recovery and propagated transactions. According to the disclosure, executing parallel operations in a secondary server improves performance and availability and how it maintains transaction order and output congruent with the primary server where transaction operations are originated. A set of specific rules is determined. The specific rules are defined on basis of a "first timestamp" and "second timestamp" attached to each transaction in the primary server and the rules form a "timestamp criteria". When a transaction meets this timestamp criteria it can be run in parallel with other transactions met the same criteria in the secondary server in accordance with the instructions set in the specific rules to maintain the transaction order and output correct.

As can be seen, implementation of fault tolerance in complex processing systems requires complex logic to ensure that the redundant components are synchronized with the primary component so that the backup component is ready to take over should the primary component fail.

Accordingly, there is a need for a simplified mechanism for providing fault tolerance which reduces the complexities related to ensuring that the redundant component is ready to take over for a filed primary component.

DETAILED DESCRIPTION OF THE DRAWINGS AND PRESENTLY PREFERRED EMBODIMENTS

The disclosed embodiments relate to providing fault tolerant operation for a primary instance, such as a process, thread, application, processor, etc., using an active copy-cat instance, a.k.a. backup instance, that mirrors operations in the primary instance, but only after those operations have successfully completed in the primary instance. The disclosed fault tolerant logic monitors inputs and outputs of the primary instance and gates those inputs to the backup instance once a given input has been processed. The outputs of the backup instance are then compared with the outputs of the primary instance to ensure correct operation. The disclosed embodiments further relate to fault tolerant failover mechanism allowing the backup instance to take over for the primary instance in a fault situation wherein the primary and backup instances are loosely coupled, i.e. they need not be aware of each other or that they are operating in a fault tolerant environment. As such, the primary instance need not be specifically designed or programmed to interact with the fault tolerant mechanisms. Instead, the primary instance need only be designed to adhere to specific basic operating guidelines and shut itself down when it cannot do so. By externally controlling the ability of the primary instance to successfully adhere to its operating guidelines, the fault tolerant mechanisms of the disclosed embodiments can recognize error conditions and easily failover from the primary instance to the backup instance.

To clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions herebefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

Figure 5:
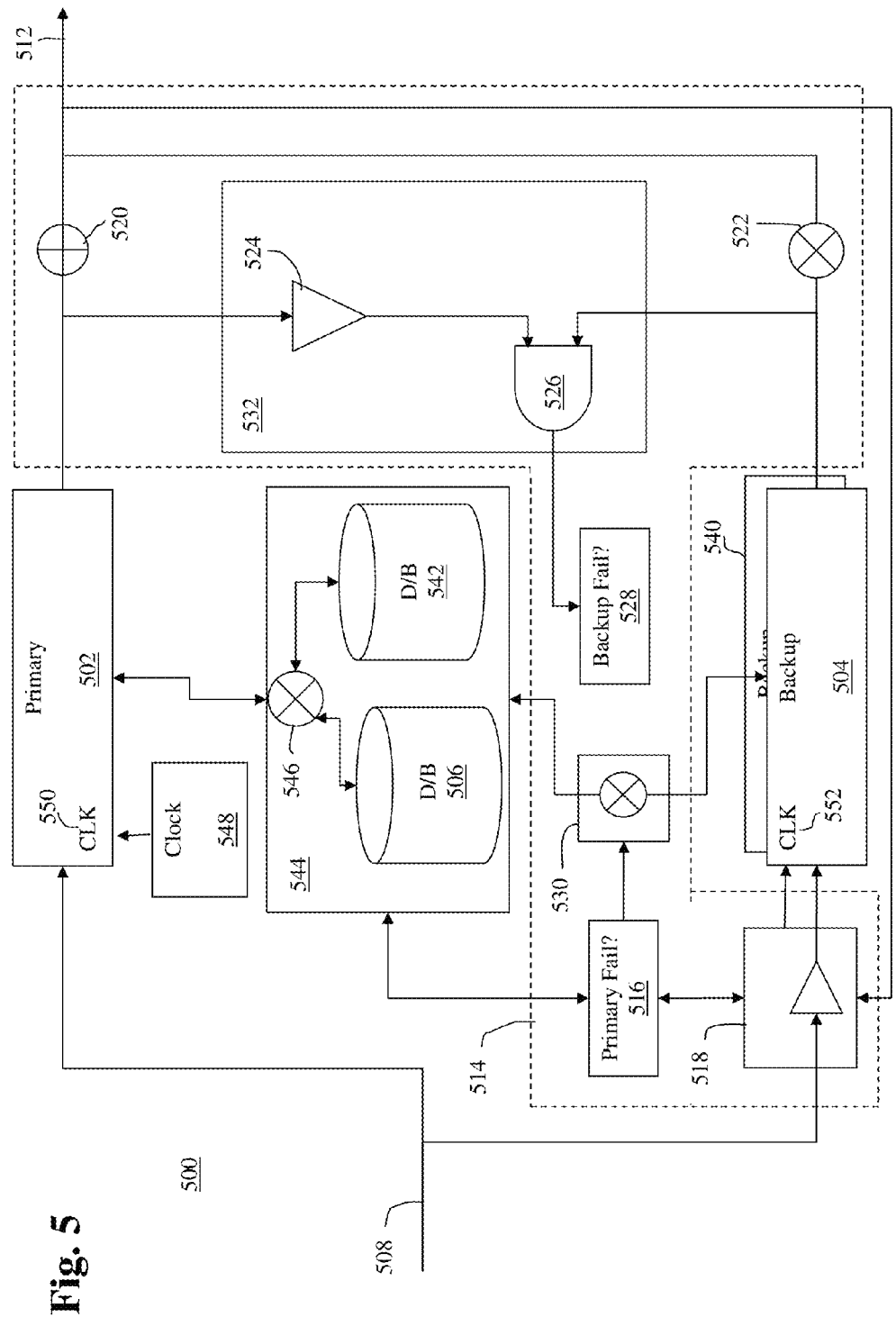
FIG. 5 depicts a block diagram of a fault tolerant system according to on embodiment.

FIG. 5 depicts a block diagram of a fault tolerant system 500 according to one embodiment. The system 500 includes a primary instance 502 and a backup instance 504, the backup instance 504 being a substantial duplicate of the primary instance 502. The primary instance 502 may include a software application executing on a processor, a process, a thread, a processor or other hardware or software component(s), consisting of, or executing on, one or more processing elements, servers, or the like. The backup instance 504 may include a separate instantiation of the primary instance 502 or a duplicate thereof, and may consist of, or execute on, the same or different one or more processing elements, server(s), logical partitions, or the like. It will be appreciated that the nature of the primary and backup instances 502, 504, as being software, hardware or a combination thereof, is implementation dependent and that the fault tolerant mechanisms described herein are generally applicable thereto. In one embodiment, the primary instance 502 is an instantiation of a multi-threaded software process executing on a sever, or logical partition thereof, having one or more processors or processing cores. The backup instance 504 is separate instantiation of the same multi-threaded software process executing on a separate logical partition or separate server of a similar type which may or may not be located in the same geographic area. In general, the primary instance 502 operates to perform a business or other function for which it is programmed. For example, the primary instance 502 may be a match server for a financial exchange which receives orders, such as trade orders, and matches those orders so as to consummate trades between the trading entities of the exchange. As will be described, the backup instance 504, being a substantial duplicate of the primary instance 502, essentially performs the same programmed business or other function. In effect, the primary and backup instances 502, 504 are loosely coupled. Loose coupling describes a resilient relationship between two or more computer systems that are exchanging data. Each end of the transaction make their requirements explicit and make few assumptions about the other end.

The primary instance 502 is coupled with a database 506 for the purpose of storing transaction data related to the function(s) performed by the primary instance 502. Herein, the phrase "coupled with" is defined to mean directly connected to or indirectly connected through one or more intermediate components. Such intermediate components may include both hardware and software based components. As will be described, the primary instance 502 is programmed to complete a transaction with the database 506 for each input it receives for processing according to its function(s) and before it can generate and transmit an output, such as a response or acknowledgement, in response to the input. Should the primary instance 502 be unable to complete the database transaction, it will internally fail and shut itself down. In one exemplary embodiment, the primary instance 502 must log data, such as regulatory or audit related data, regarding each received input to a table in the database 506.

A transaction typically refers to a sequence of information exchange and related work (such as database updating) that is treated as a unit for the purposes of satisfying a request and for ensuring database integrity. For a transaction to be completed and database changes to made permanent, a transaction has to be completed in its entirety. A typical transaction is a catalog merchandise order phoned in by a customer and entered into a computer by a customer representative. The order transaction involves checking an inventory database, confirming that the item is available, placing the order, and confirming that the order has been placed and the expected time of shipment. If we view this as a single transaction, then all of the steps must be completed before the transaction is successful and the database is actually changed to reflect the new order. If something happens before the transaction is successfully completed, any changes to the database must be kept track of so that they can be undone.

A program that manages or oversees the sequence of events that are part of a transaction is sometimes called a transaction manager or transaction monitor. In one embodiment, transactions are supported by Structured Query Language, a standard database user and programming interface. When a transaction completes successfully, database changes are said to be committed; when a transaction does not complete, changes are rolled back, i.e. partly completed database changes are undone when a database transaction is determined to have failed. In IBM's Customer Information Control System product, a transaction is a unit of application data processing that results from a particular type of transaction request. In CICS, an instance of a particular transaction request by a computer operator or user is called a task. A commit is the final step in the successful completion of a previously started database change as part of handling a transaction in a computing system.

In one embodiment, the database 506 is an "ACID" compliant database. ACID (atomicity, consistency, isolation, and durability) is an acronym and mnemonic device for learning and remembering the four primary attributes ensured to any transaction by a transaction manager. These attributes are:

Atomicity. In a transaction involving two or more discrete pieces of information, either all of the pieces are committed or none are.

Consistency. A transaction either creates a new and valid state of data, or, if any failure occurs, returns all data to its state before the transaction was started.

Isolation. A transaction in process and not yet committed must remain isolated from any other transaction.

Durability. Committed data is saved by the system such that, even in the event of a failure and system restart, the data is available in its correct state.

The ACID concept is described in ISO/IEC 10026-1:1992 Section 4. Each of these attributes can be measured against a benchmark. In general, however, a transaction manager or monitor is designed to realize the ACID concept. In a distributed system, one way to achieve ACID is to use a two-phase commit ("2PC"), which ensures that all involved sites must commit to transaction completion or none do, and the transaction is rolled back.

As was discussed above, the primary instance 502 is further operative to generate one or more responses/outputs and/or acknowledgements for each input it receives. As will be described below, the primary instance's 502 dependence on completing an external transaction with the database 506 and its operation to generate at least one response or output for each input received confirming the successful processing thereof, is utilized by the disclosed fault tolerant mechanisms described herein to detect faults and failover to the backup instance 504 when necessary. It will be appreciated that the disclosed embodiments may utilize any operationally dependent external transaction and any indicator which confirms the processing of a given input of the primary instance 502 to accomplish the disclosed functionality.

The system 500 further includes fault tolerant logic 514. The components of the fault tolerant logic 514 will be described with reference to their functionality as shown in FIGS. 1-4 which depict flow charts showing the operation of a fault tolerant system of FIG. 5 according to one embodiment. The fault tolerant logic 514 may be implemented in hardware, software or a combination thereof and further may include computer program logic, processes, threads or combinations thereof which interact with the primary and backup instances 502, 504, as well as the database 506 and implement the functionality described herein. The fault tolerant logic 514 may execute on the same logical partitions, servers or processors as the primary and/or backup instances 502, 504 or on a separate server or processor and interconnected with the primary and backup instances 502, 504 via suitable means, such as a network or other interconnect.

In particular, the fault tolerant logic 514 includes an input receiver 518 coupled between the network 508 and the input to the backup instance 504, primary failure detection logic 516 coupled with the outputs of the primary instance 502, the input receiver 518 and the database 506, and backup failure detection logic 528 coupled with the network 508 (not shown) and output matching logic 530. The input receiver 518 receives copies of the input(s) which should have also been received by the primary instance 502 from the network 508. Of course, if there is a communication or network failure with the primary instance 502, the receipt of the input(s) by the fault tolerant logic 514 will detect the fault as will be described. The input receiver 518 buffers the input(s) and gates them to the backup instance 504 as will be described. The primary failure detection logic 516 monitors the output(s) of the primary instance 502 and, as will be described, determines if the primary instance 502 has failed. If the primary failure detection logic 516 determines that the primary instance 502 has failed, the primary failure detection logic 516 also acts to shut down the primary instance 502 and fail over to the backup instance 504, determining whether there are unprocessed input(s) that the primary instance 502 failed process and then causing the backup instance 504 to take over normal operations from the primary instance 502. The backup failure detection logic 528 monitors the output(s) of both the primary and backup instances 502, 504 for a given input(s) and determines whether they match or not. In one embodiment, a mismatch triggers a fault in the backup instance 504. In an alternate embodiment, a mismatch triggers a fail over from the primary instance 502 to the backup instance 504 as described herein. The backup failure detection logic 528 also checks the network connectivity of the backup instance 504 and determines a fault in the backup instance 504 when the network connectivity of the backup instance 504 has been determined to have failed.

In operation of the system 500, input(s) are received by, or at least transmitted to, the primary instance 502, such as via a network 508. The input(s) may be received from, or transmitted by, other entities also coupled with the network 508 and/or they may be generated by the primary instance 502 itself. As will be described, the fault tolerant logic 514 may also generate input(s) to the primary instance 502 to determine whether or not the primary instance 502 is operating correctly. The network 508 may include one or more input busses, public or private wired or wireless networks, or combinations thereof and may further feature security or authentication protocols as well as error detection and correction protocols. In one embodiment, the network 508 implements the TCP/IP protocol suite. It will be appreciated that any network protocol and communications technology may be used with the disclosed embodiments. A copy of the input(s) is also received by an input receiver 518 of the fault tolerant logic 514, the receipt of which may occur substantially simultaneously with the presumed receipt thereof by the primary instance 502, or within a acceptable margin thereof depending upon the implementation. In one embodiment, inputs are multicast on the network 508 to both the primary instance 502 and the fault tolerant logic 514. Multicast is communication between a single sender and multiple receivers on a network. It will be appreciated that multiple inputs may be multicast to the primary instance 502 and the fault tolerant logic 514 and that, due to the implementation of the network 508, the input(s) may be received by the fault tolerant logic 514 in a different order and/or at a different time than they are received by the primary instance 502. In one embodiment, the network 508 includes an order entry bus of a match server of a trading engine used by a financial exchange. It is a feature of the disclosed embodiments that the order of receipt of the input(s) does not matter. As will be described, the input(s) received by the fault tolerant logic 514 are buffered by the input receiver 518 and gated to the backup instance 504 under the control of the fault tolerant logic 514. In this way, as will be described in more detail below, the fault tolerant logic 514 surrounds the backup instance 504 to ensure synchronization with the primary instance 502 without requiring that the backup instance 504 be aware of the fault tolerant logic 514 external thereto.

Figure 1:
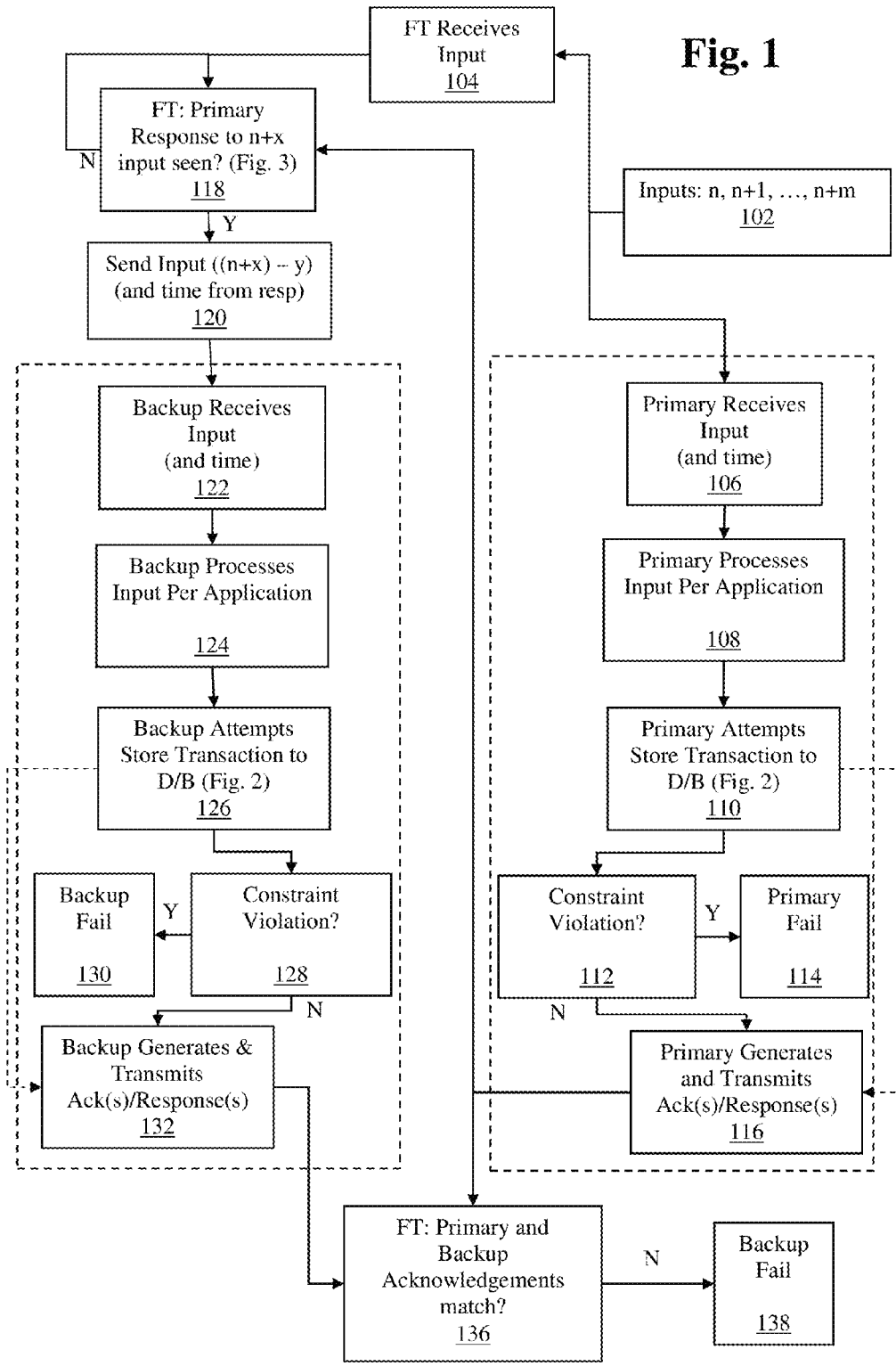
FIG. 1 depicts a flow chart showing the operation of a fault tolerant system of FIG. 5 according to one embodiment.
Figure 2:
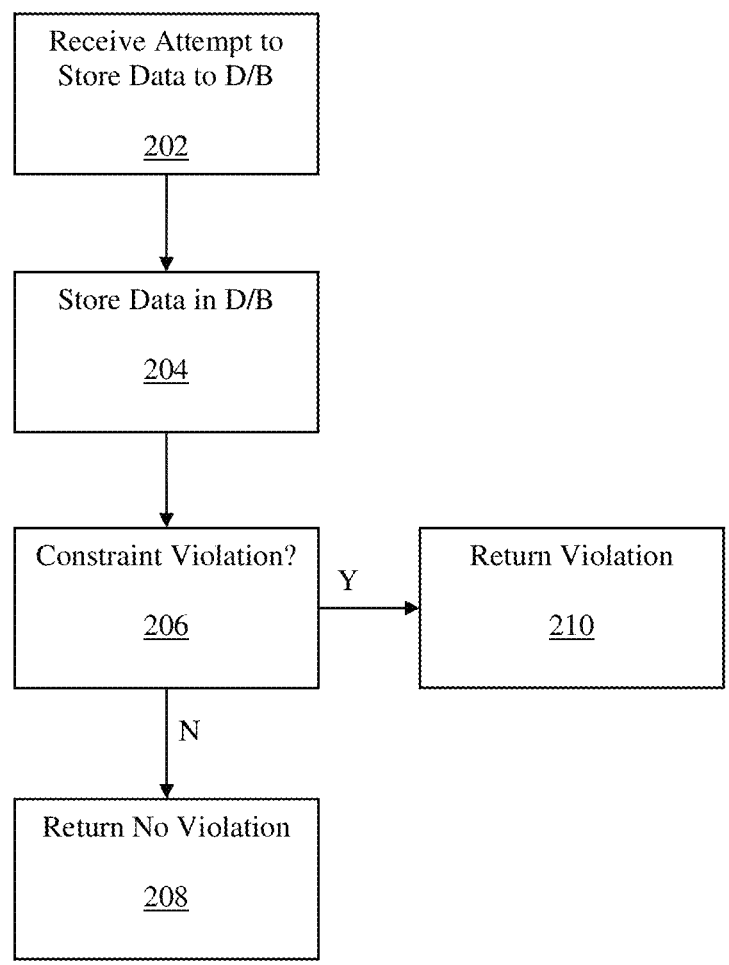
FIG. 2 depicts a flow chart showing the operation of a database for use with the fault tolerant system of FIG. 5 according to one embodiment.

As shown in FIG. 1, under normal operating conditions, as input(s) (block 102) are received by the primary instance 502 over the network 508 (block 106), the primary instance 502 processes the input(s) according to its programmed function, e.g. matches trader order inputs to consummate trades in a financial exchange. At the completion of, or during, processing, the primary instance 502 attempts to transact with the database 506, e.g. to store input related data, such as audit data or transactional data related to the receipt and/or processing of the input(s), shown in more detail in FIG. 2 (blocks 202, 204) which depicts a flow chart showing the operation of a database for use with the fault tolerant system of FIG. 5 according to one embodiment. If the transaction with the database 506 fails for reasons other than a constraint violation (not shown in FIG. 2), the primary instance 502 may retry the transaction until it is successful or until a threshold of successive failures has occurred. If the database transaction is successful (blocks 206, 208 of FIG. 2), the primary instance 502 generates and transmits one or more responses/outputs and/or acknowledgements, as dictated by its program function, such as to the originator of the input(s). For example, where the primary instance 502 is a match server, the input(s) may include trade orders and the response(s) thereto may include acknowledgements of the receipt of the orders and confirmation of trade execution. In addition to being transmitted to its intended recipient, the output(s) of the primary instance 502 are also copied to the matching logic 532 of the fault tolerant logic 514. The matching logic 532 includes a buffer 524 and a comparator 526. The buffer 524 holds the output(s) of the primary instance 502 until the corresponding output(s) of the backup instance 504 are transmitted by the backup instance for a given input(s). The output(s) of the primary and backup instances 502, 504 for a given input(s) are then compared by the comparator 526 and the results thereof are reported to the backup failure detection logic 528. It will be appreciated that the comparator 526 may determine an exact match between the compared outputs or a substantial match there between. Further, the comparator may only compare a portion of the output(s), a hash value, or checksum, or combinations thereof.

In one embodiment, the primary instance 502 implements temporal functionality, i.e. performs functions on the inputs based on time parameters, such as the current clock time. For example, the primary instance 502 may compare the time that an input was generated with the time that the input reaches the primary instance 502. Where a given input represents an order, this functionality may be utilized to determine if the order has expired. As shown in FIG. 5, the primary instance 502 includes a clock input 550 which is coupled with a clock 548, such as a clock circuit or other device operative to provide an indication of time. The backup instance 504 also features a clock input 552 which similarly receives a time input for performing the particular temporal functions on the copies of the inputs. However, as noted elsewhere, the backup instance 504 necessarily processes the inputs later in time than the primary instance 502. If the backup instance 504 also used the current time as an input, it may not end up with the same result as the primary instance 502. Accordingly, once the primary instance 502 has completed its processing and generated an output result based thereon, it includes data representative of the particular time used in its processing in the output. This data is then extracted by the input receiver 518 and provided to the clock input 552 of the backup instance along with the corresponding input, thereby providing the backup instance 504 with the equivalent time data as used by the primary instance 502, even if the real time is much later. It will be appreciated that this time data may be specified as an absolute time or a relative or elapsed time period. This ensures that the backup instance accurately produces the same results with respect to temporal based functions.

Should the database 506 transaction fail due to a constraint violation (blocks 206, 210 of FIG. 2), the primary instance 502 will enter a failure state (block 114). As will be described in more detail below, the fault tolerant logic 514 is capable of forcing a constraint violation to be returned by the database 506 to the primary instance 502 so as to force the primary instance 502 into a failure state. This is done for the purpose of disabling the primary instance 502 so that the backup instance 504 can take over in fault situations, in effect taking advantage of the primary instance's own internal fault handling mechanisms. It will be appreciated that causing a constraint violation in response to a database transaction by the primary instance 502 is one example of a mechanism for interrupting or inhibiting the primary instance 502 from completing an operationally dependent external transaction and that other such mechanisms may be available and are dependent upon the implementation of the primary instance 502. Further, while primary instance 502 could also be externally terminated, such as by killing the process, removing power from the executing server, etc., forcing the primary instance 502 to self terminate or fail soft, allows for a cleaner exit, i.e. resources in use by the primary instance 502, such as allocated memory, registers, stack space, etc., can be returned to the operating system and any ambiguous states, such as uncommitted or unresolved transactions, can be resolved. Further, by forcing the primary instance 502 to fail, rather than simply cutting off the primary instance from communicating or interacting, the continued consumption of resources by the primary instance 502, and the subsequent effects on other processes, etc., can be mitigated. In addition, by utilizing the return of a constraint violation to the primary instance 502, the primary instance 502 is guaranteed to be halted at a known point and/or in a known, at least external, state and that the sequenced set of inputs that have been processed by the primary instance 502 prior to failure can be known or discovered by the fault tolerant logic 514 even if the primary instance 502 is unreachable or otherwise in an inconsistent state.

In an alternative embodiment, inputs, or transactions, may be differentiated based on whether their completion is critical or not. In particular, functionality may be provided which allows differentiation between database operations, the completion of which should be waited on, and operations that could still be 'in flight' or in process, while other processing continued, e.g. while messages were returned to the customer. For example, persisting a rejected order involves three calls— one to the fault tolerance table (message sequence, one per message), one to the order history table, and one to the orders table. Only the first call need be waited on. If the engine were to fail after sending the response to the message but prior to successfully persisting the orders and order history call, the impact would be that one rejected order was not logged. This is considered not significant, and by determining which persistence operations had business significance in the face of our policy on failures we could take many database transactions out of the round trip time. This is most obvious when looking at orders. Good Till Cancel and Good Till Date orders (GTC/GTD) are orders that are guaranteed to be working regardless of exchange or engine failures. As a result we must guarantee they are persisted prior to replying to the message. By CME policy, Day orders and GTC orders for the current day (but not other GTC orders or GTD orders) are eliminated on exchange failure and we need not wait on them. Accordingly, the primary instance 502/backup instance 504 may be implemented to distinguish between two different types of inputs, those for which the database operation must complete before generating an output, and those for which the database operation need not complete and therefore the output can be generated prior to completion. As shown in FIG. 1, in parallel with attempting store the transaction (Blocks 110, 126), for those inputs which do not require waiting, the processing may continue to transmit the Acknowledgments/Responses (Blocks 116, 132) without waiting for the database 506 to report on the completion of the store (Blocks 112, 114, 128, 130). It will be appreciated that the primary and backup instances 502, 504 may be suitably programmed to identify those transactions which depend upon completion of the database 506 operation and those that do not.

It will be appreciated that the fault tolerant logic 516 does not actually need to shut down the primary instance 502 but simply needs to guarantee that the primary instance 502 will not send any more operations to the outside world, thereby conflicting with the backup instance 504 that is taking over. In particular, in the disclosed embodiments, the fault tolerant logic 516 assumes the worst case scenario wherein the primary instance 502 cannot be contacted, killed or otherwise directly impacted. By blocking the primary instance 502 from completing an operationally dependent external operation, such as a database transaction, it is guaranteed that the backup instance 504 can take over for a primary instance 502 that has totally disconnected from the network without having to contact that primary instance or attack it in any way directly. Once the database block-out is completed, it does not matter to the backup instance 504 if the primary instance 502 remains in an unresponsive state or if the primary instance self terminates—but when the primary instance 502 discovers the block-out via a constraint violation, it may as well shut down as it is now a useless process and logging information and orderly shutting down allows those monitoring the process to note the failure and take appropriate restart steps.

As was described above, the input(s), i.e. copies thereof, are also received by the input receiver 518 of the fault tolerant logic 518 (block 104). The input receiver 518 buffers the received input(s), such as in the order of receipt and gates those input(s) to the backup instance 504 for processing. In particular, for a given input, e.g. n, n−1, n−y, etc., the input receiver 518 monitors the output(s) of the primary instance 502 to determine when an output(s) corresponding to a subsequently received input(s), e.g. n+1, +2, +x, is transmitted by the primary instance 502 (block 118). When this occurs, the input receiver 518 sends one or more of the given prior input(s), e.g. (n+x)−y, to the backup instance 504 for processing (block 120). In this way, the backup instance 504 is always processing behind, but in step with, the primary instance 502. Further, the receipt of an output for a subsequently received input, in one embodiment, ensures that the input waiting for processing by the backup instance 504 is currently processing, or has already been successfully processed, by the primary instance 502. The backup instance 504 then processes the input(s) in the same manner as the primary instance 502 (described above) (blocks 122, 124, 126, 128, 139, 132). However, in circumstances where the primary instance 502 is operating normally and no faults have been detected, the backup instance 504 is prevented from interacting with the database 506 and instead interacts with database mimic logic 530 which mimics and returns a successful database transaction result back to the backup instance 504. In an alternative embodiment, the backup instance 504 may be programmed so as not to attempt interaction with the database 506, thereby eliminating the need for the database mimic logic 530. Further, while the output(s) of the backup instance 504 are provided to the matching logic 532 to determine if they match with the corresponding output(s) of the primary instance 502, the backup instance 504 is prevented from otherwise communicating those output(s) to other entities so as not to interfere with the normal operation of the primary instance 502. Gating logic 520, 522, under control of the fault tolerant logic 514, controls whether the primary or backup instance 502, 504 is permitted to transmit its output(s) to external entities, such as via the network 512, based on whether there has been a failure detected, etc.

As long as the primary and backup instances 502, 504 continue to operate normally, processing input(s) and generating the requisite output(s), the system 500 operates as described.

Figure 3:
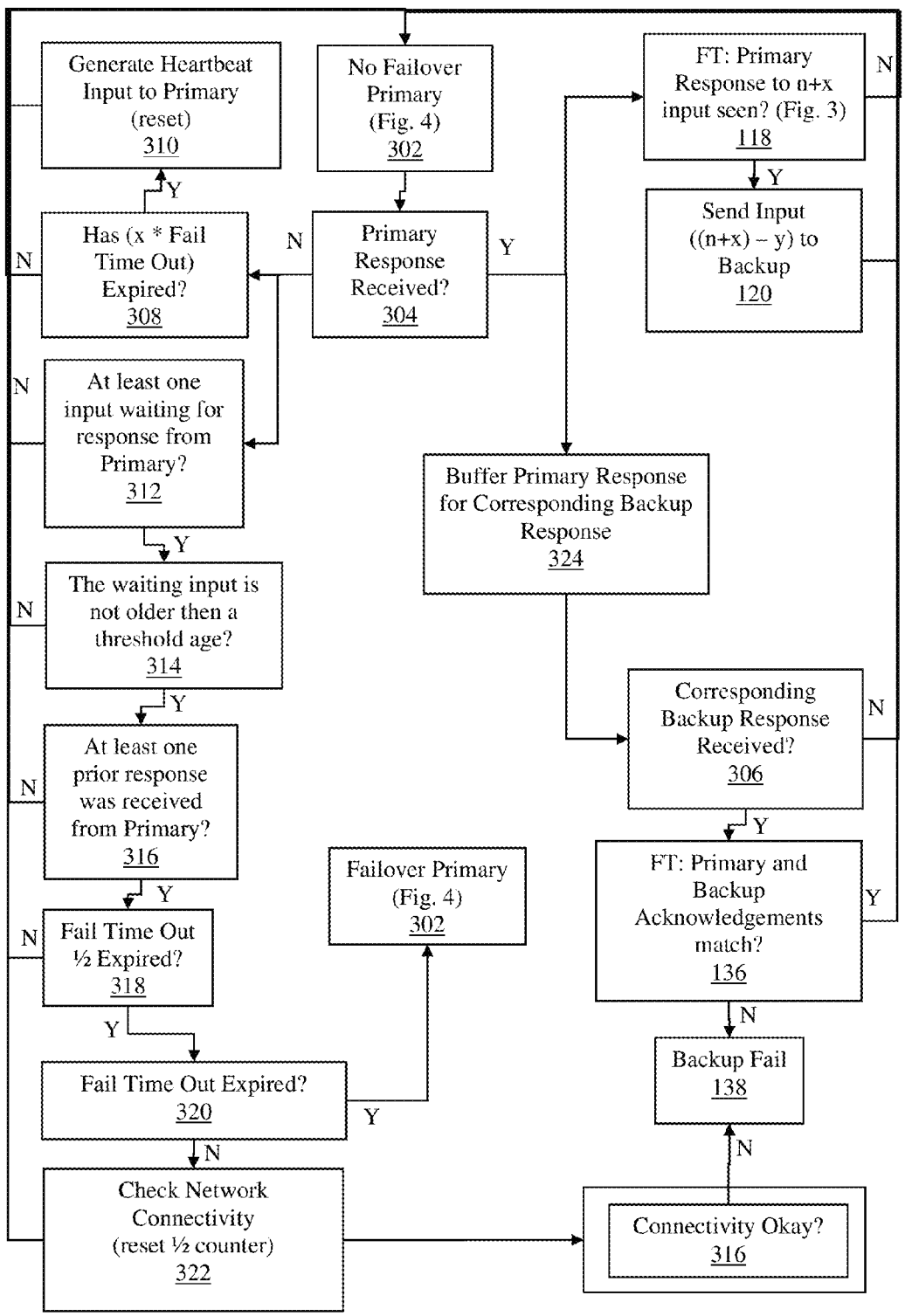
FIG. 3 depicts a more detailed flow chart showing the operation of the fault tolerant system of FIG. 5.

FIG. 3 depicts a more detailed flow chart showing the operation of the fault tolerant system 500 of FIG. 5, and in particular, the primary and backup failure detection logic 516, 528 with respect to monitoring for, detection and handling of fault situations. As shown in FIG. 3, the primary and backup failure detection logic 516, 528 implement multiple process/event loops/flows and/or threads which monitor for events and trigger actions based on those events, or the lack thereof, to implement the desired fault tolerant activity. It will be appreciated that number of processes, threads, etc. used to implement the described functionality, their execution being in parallel or serially, the nature of the events being monitored and the actions taken in response to a given event or the lack thereof, are implementation dependent and, in particular, depend on what events, conditions, or combinations thereof, are defined as faults and what events, conditions, or combinations thereof, are defined as normal operating conditions. The fault tolerant logic 514, and in particular, the primary and backup failure detection logic 516, 528, will be described with respect to an exemplary set of events and conditions that must be satisfied to find a fault in either the primary or backup instance 502, 504, as well as an exemplary set of actions to take with respect therewith. It will be appreciated that there may be other conditions and actions with respect thereto that may be implemented within the scope of the disclosed embodiments.

Figure 4:
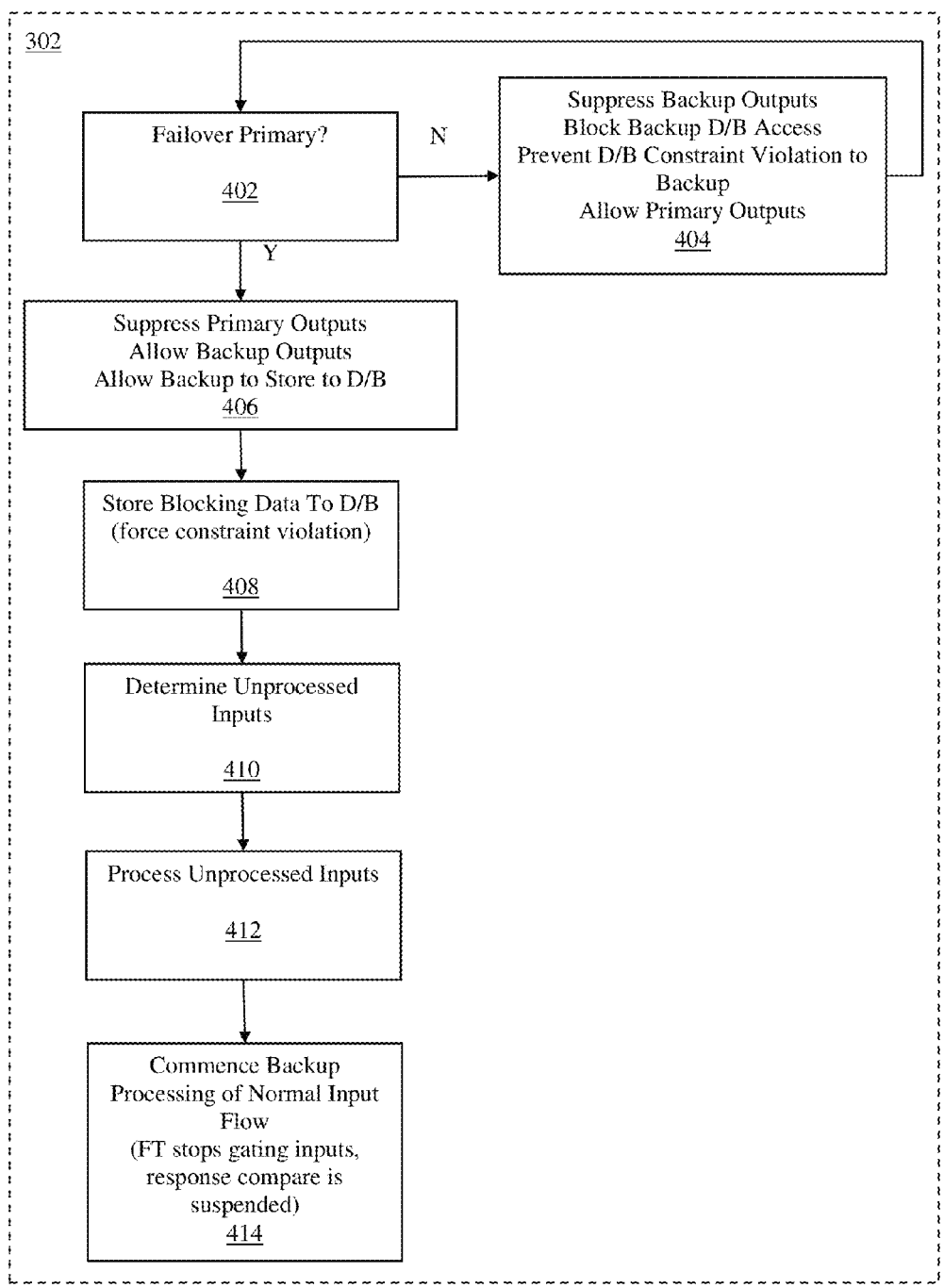
FIG. 4 depicts a more detailed flow chart showing the operation of the fault tolerant system of FIG. 5.

As long as no faults have been detected, as will be described, the system 500 remains in a normal operating state with the primary instance 502 operating and the backup instance 504 lagging behind in step with the primary instance 502 (block 302). As shown in FIG. 4, under normal operating conditions, the backup instance 504 output(s) are suppressed from being communicated, while the primary instance 502 output(s) are allowed, by the gating logic 520, 522, to external entities, such as over the network 512. Further, the backup instance's 504 access to the database 506 is blocked and successful completion of the backup instance's 504 database transactions are mimicked by the database mimic logic 530, or alternatively, the backup instance 504 is programmed to not interact with the database 506.

On each given iteration of the process flow, which may be determined by a clock, counter, event or other trigger, a determination is made as to whether or not the primary instance 502 has transmitted an output (block 304). If one or more outputs have been received, it is determined, as was described above, whether the outputs correspond to one or more inputs received subsequent to other prior received inputs (block 118) such that the prior received inputs should have been processed by the primary instance 502 and therefore can then be sent to the backup instance 504 for processing (block 120). Further, the received output(s) are buffered pending receiving the corresponding output(s) from the backup instance 504 (blocks 324, 306). Once the corresponding output(s) are received from the backup instance 504, they are compared with the output(s) of the primary instance 502 (block 136). If they match, processing continues. If they do not match, in one embodiment, a fault in the backup instance 504 is determined and the backup instance 504 is placed into a fail state (block 138). Alternatively, a mismatch between the corresponding output(s) of the primary and backup instances 502, 504 may be determined to reflect a failure of the primary instance 502 triggering the fail over mechanisms described herein.

If there has been no output from the primary instance 502, it is next determined if a threshold time out has elapsed or been exceeded since an output was last detected from the primary instance. In one embodiment, a global time out threshold is defined for use by all of the event/process flows described herein which may then utilize the threshold or multiples thereof for their comparison operations. Alternatively, separate thresholds may be defined for each particular process. In the present embodiment, if no output(s) have been received from the primary instance 502 for a multiple of the time out threshold, e.g. 10 times the threshold, (block 308) the fault tolerant logic 514 generates a heartbeat input to the primary instance 502, which as described above, is also copied to the backup instance 504 and triggers the mechanisms herein to force some form of output from the primary instance 502. This allows the fault tolerant logic 514 to discover whether the lack of activity from the primary instance 502 is due to a failure or is legitimate, e.g. it doesn't have any inputs to process. The heartbeat input will also be received by the fault tolerant logic 514 just like any other input that is received and will trigger the other fault detection processes described herein to determine whether the primary instance 502 has actually failed.

Additionally, when it has been determined that no output from the primary instance 502 has been received, a set of conditions are checked, serially (as shown), in parallel, or some other logical arrangement, to conclude that the primary instance 502 has failed. In alternative embodiments, the conclusion of failure of the primary instance 502 may be reached by other logical means and based on other conditions and/or events. In the exemplary embodiment, the conditions that are checked include determining that there is an input that was supposedly received by the primary instance 502, as determined by its receipt by the fault tolerant logic 514, that is waiting for an output to be generated (block 312). Again, if there is no input to the primary instance 502, there legitimately will be no output therefrom. In addition, if there is an input waiting for an output, the age of the input is determined and compared with a defined threshold age (block 314). If the input is older than the threshold age, then no fault will be determined. This prevents occasionally dropped inputs, such as inputs received during startup of the system 500, which may be expected to occur depending on the implementation and the load on the primary instance 502, from being processed by the backup instance 504 and from causing a failover condition. This check may be tailored to accommodate the level of tolerance for faults in the system 500 that are deemed acceptable according to the implementation, e.g. the acceptable threshold age may be adjusted and/or the frequency of such faults may be measured and compared against an acceptable threshold. In systems 500 which can tolerate absolutely no errors or faults, this check may not be implemented.

Further, it is determined whether a prior output has been received from the primary instance 502 which indicates that the primary instance was functioning in the past and prevents a fault condition from being determined when the system 500 is first started (block 316). Again, in systems 500 which cannot tolerate faults, this check may not be implemented. If these conditions are met, but only one half of the threshold time out has elapsed, or some other portion thereof (blocks 318, 320), the network connectivity of the fault tolerant logic 514 and/or backup instance 504 is checked. In one embodiment, a ping signal is transmitted from the fault tolerant logic 514, or the server it is executing on, to a recipient such as the primary instance 502 or the server it is executing on, e.g. a ping utility/process may be used transmit a test communication designed to determine the state of network connectivity. While processing continues, a separate process (block 316) awaits a response to the ping which would indicate that network connectivity is okay. If no response is received, the backup instance 504 is placed into a fail state due to presumed loss of network connectivity. If the threshold timeout has been exceeded and all of the other conditions have been met, a failure of the primary instance 502 is determined (block 302).

As shown in FIG. 4, if a failure of the primary instance 502 is determined (block 402), the primary instance 502 is failed over to the backup instance 504. In particular, the outputs of the primary instance 502 are suppressed or otherwise inhibited by the gating logic 520 from being communicated while the outputs of the backup instance 504 are permitted to be communicated by the gating logic 522. In addition, the backup instance 504 is permitted to transact with the database 506. The primary failure detection logic 516 then stores blocking data into the database 506. The blocking data is configured so as to occupy storage that the primary instance 502 would attempt to also store into. In one embodiment wherein the primary instance 502 is multithreaded, the primary failure detection logic 516 is able to handle blocking out N number of asynchronously writing threads that may not be writing in sequence and may be writing continuously (attempting to write a block, jump ahead on failure . . . etc). The blocking data will cause the database 506 to return a constraint violation to the primary instance 502 should the primary instance 502 still be active and trying to process inputs. As was described, the constraint violation should force the primary instance 502 to self-fail. Once the primary instance 502 has been blocked, the fault tolerant logic 514 determines which inputs need to be processed by analyzing the inputs received by the input receiver 518 that remain unprocessed and also analyzing the database 506 to determine the final actions of the primary instance 502 prior to failure (block 410). These inputs are then sent to the backup instance 504 to be processed (block 412). Normal processing by the backup instance is then started (block 414).

In one embodiment, if the backup instance 504 fails, it may be prevented from taking over for a failed primary instance 502. Further, another backup instance 504 may be started to take over for the failed backup instance 504. In the case of failure of either the primary or backup instances 502, 504, alerts may be transmitted to other monitoring programs or processes or to monitoring staff alerting them to the need for intervention.

By following behind during normal operations of the primary instance 502, the backup instance 504 can take care of any unfinished processing by a failed primary instance 502 without having to worry about staying in sync with the primary instance 502. In operation, the disclosed fault tolerant logic 514 detects failures when the primary instance 502 stops operating completely, continues processing but fails to send the proper output(s) or when the corresponding output(s) of the primary and backup instances 502, 504 for a given input(s) fail to match.

Figure 6:
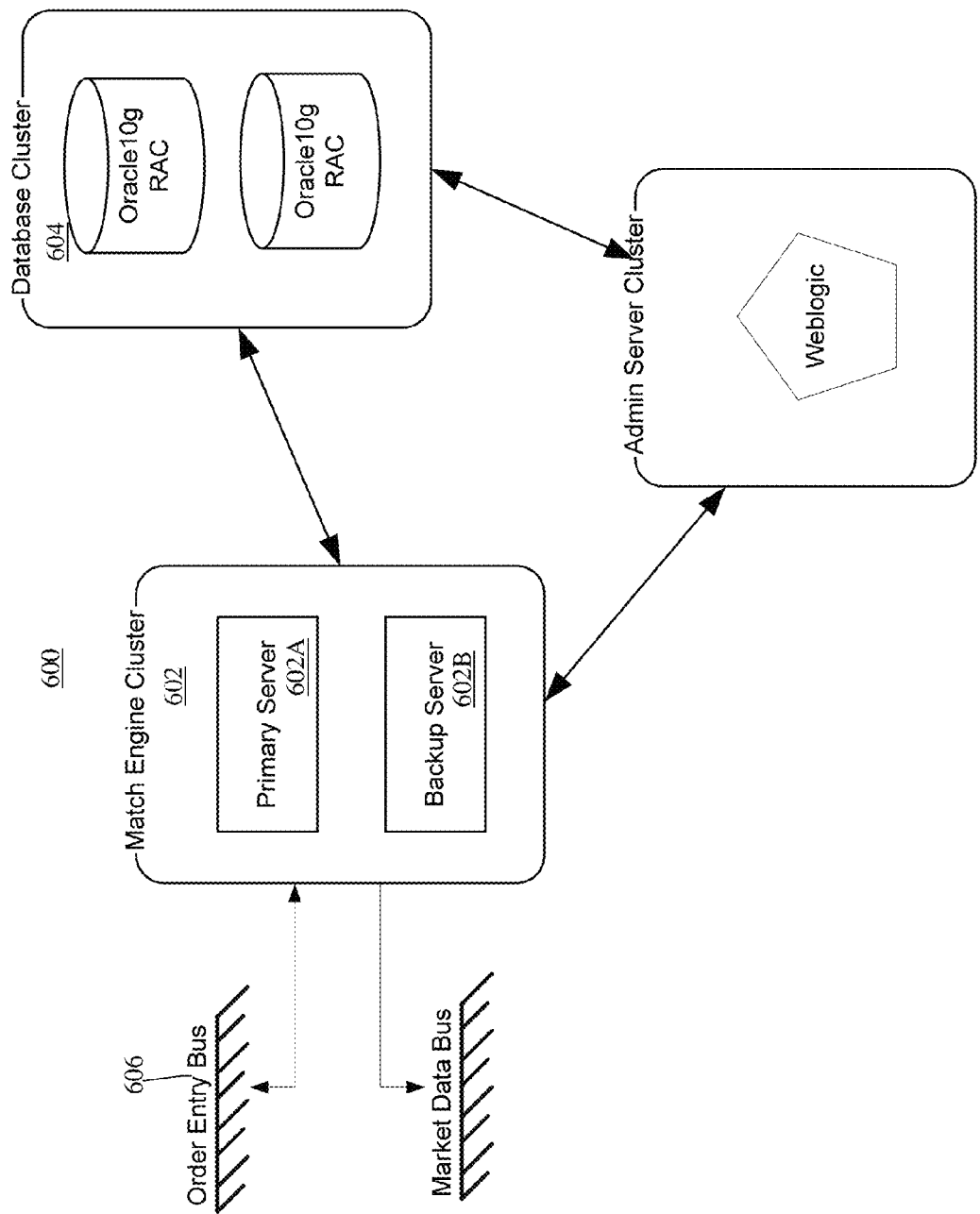
FIG. 6 depicts a block diagram of a fault tolerant system according to an alternative embodiment.

In one embodiment, the primary and backup instances 502, 504 are instances of a match engine for a trading engine 600 of a financial exchange, such as the Falcon Trading Engine 600 utilized by the Chicago Mercantile Exchange, as shown in FIG. 6. The Match Engine 602 and Database 604 are run on redundant pairs. The system is designed so that any single Match Engine 602A, 602B or database server can fail without an interruption to trading activity. Falcon Match Engine fault-tolerance is handled at the application level by a custom architecture described herein.

The Match Engine 602 has been designed to run in a paired primary/backup configuration as described above. Each individual Falcon Match Engine 602A, 602B is one process with a set of loosely coupled threads. The functionality of a complete match engine process is subdivided among these threads. This allows an easy parallelization of work over separate physical processors and use of lower cost hardware.

Figure 7:
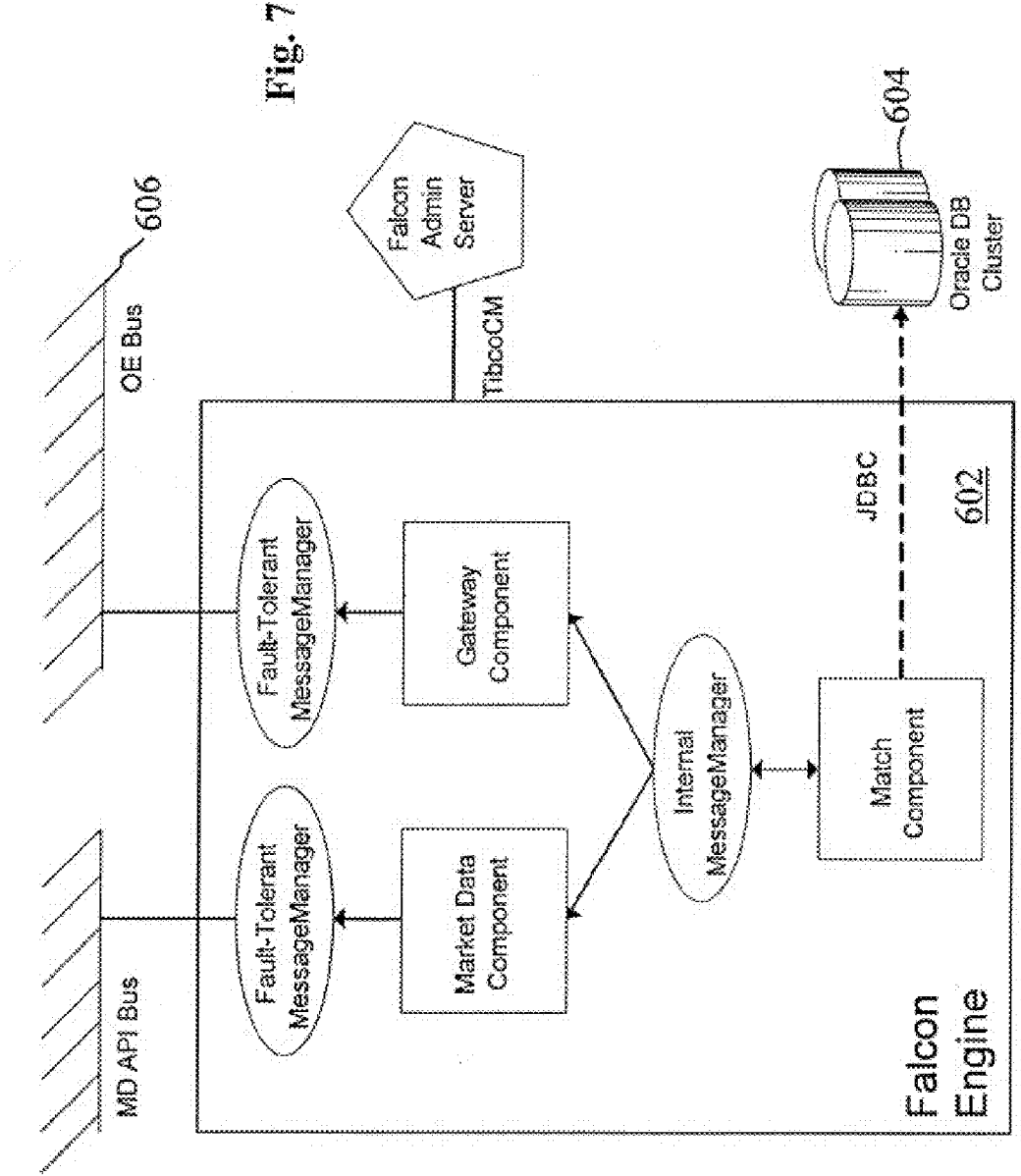
FIG. 7 depicts a more detailed block diagram of the fault tolerant system of FIG. 6.
Figure 8:
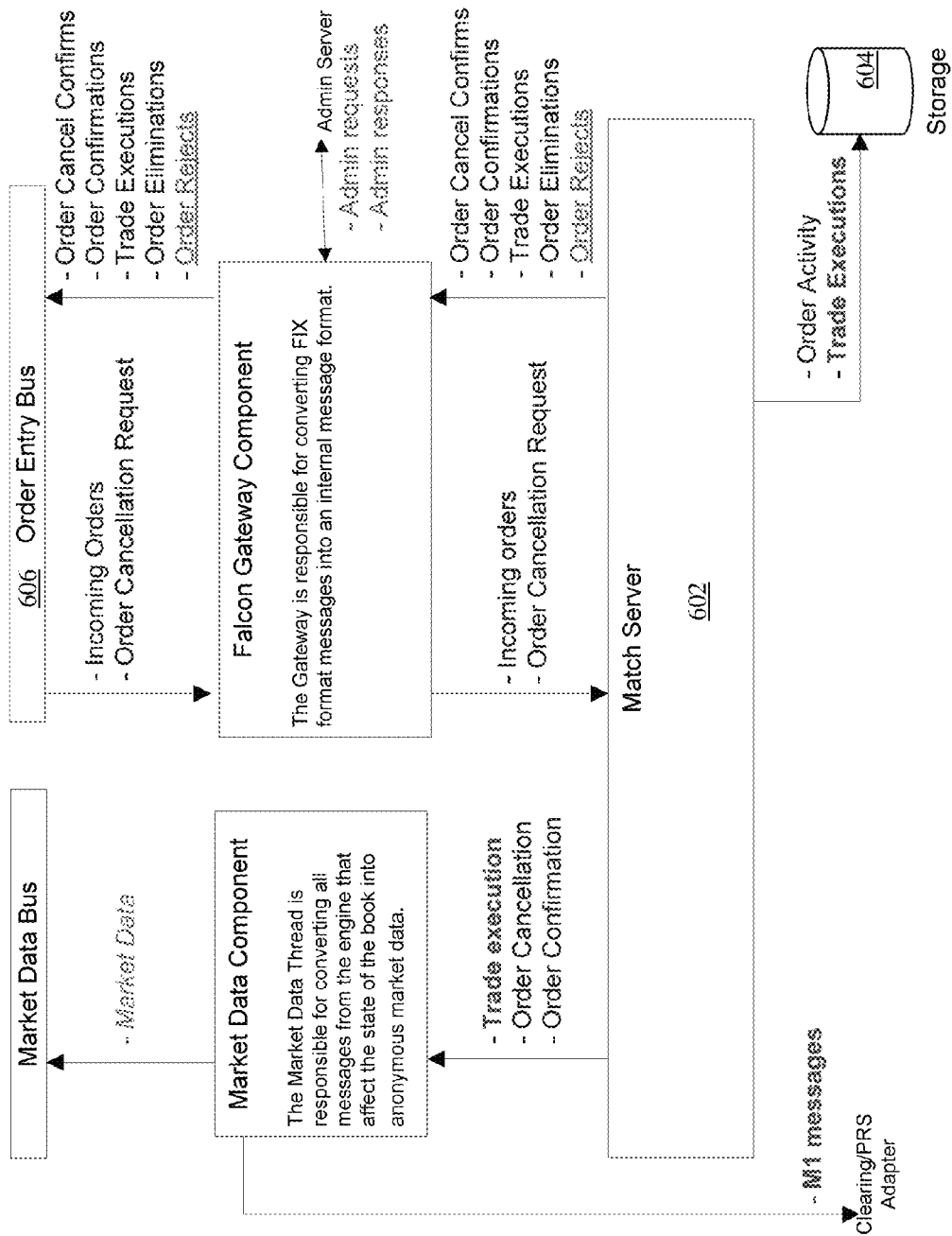
FIG. 8 depicts an alternate more detailed block diagram of the fault tolerant system of FIG. 6.

FIGS. 7 and 8 depict more detailed block diagrams of the fault tolerant system of FIG. 6. The Match Component 602 is the ultimate authority of the Falcon engine. It performs the order accepting and matching and also controls the only in-line, transactional persistence in the Falcon engine. The Match Component 602 will accept requests for quotes, inbound orders and order cancellations from the Falcon Gateway. It will send responses and trade executions out to both the Market Data Component and the Falcon Gateway. All configuration and management calls are sent through the Match Component 602 via the Gateway using, for example, Java Messaging Service ("JMS"). The Match Component 602 communicates all management and configuration information to the other components via the Falcon internal message manager.

Each Falcon instance 602A. 602B will go through specific engine states before it is ready to accept new incoming orders. The Match Component 602 is the ultimate authority on engine state and controls all other components in each Falcon Match Engine server. Market schedules are stored in an Admin database and communicated to the Match Server (at start-up and through Trading calendar Updates during runtime). State changes are then scheduled in the Match Component and initiated by the Match Component. After a state change occurs, this information is communicated to the rest of the components via an AdminOperation message. The Admin server can also change the match servers' current state by sending an AdminOperation. All administrative Admin-Operations calls are received by the Gateway Component and sent to the Match Component. Once the Match Component has acknowledged the AdminOperation, all other components respond in the same manner.

The main execution path of the match component 602 is a single thread. This thread pulls messages off the internal message bus, processes them, and sends out responses. As a result, only one operation is going on in the match thread at any given time. Regarding persisting in the database, many threads may be used asynchronously and order is restored afterwards. As the size of a "block" is equal to # of database threads*database batch size, the primary failure detection logic 516, as described above, is able to handle blocking out N number of asynchronously writing threads that may not be writing in sequence and may be writing continuously (attempting to write a block, jump ahead on failure . . . etc).

For a given order book in the match thread, there is a single allocation algorithm and a configurable amount of overlays. Incoming orders are passed in sequence first to each overlay, and then to the allocation algorithm. Each overlay and allocation algorithm then generates appropriate fills. Once the order has passed through each of the above, the remainder (if any) is placed on the book and fill messages are sent out. There are two overlays in Falcon 1.5 which control the order allocation for incoming orders—Lead Market Maker ("LMM") and TOP (with Min/Max). With LMM, orders from certain users get preferential allocation, say x % of every incoming order. In return for preferential allocation, those users agree to quote many markets and provide liquidity. With TOP, orders that turn the market [first order at a better price] get preferential allocation over other orders that join it at the same price. Min and Max are modifiers that determine what MIN size an order must be and what MAX allocation it can get before it loses top status. A book can be configured with all overlays, some overlays, or no overlays at all.

The match thread does not fire timed events (such as group open/group close). Instead, these events are fired by a dedicated thread. Once the event fires, it is converted into a message and placed on the match thread's queue like any other message. As a result, they are processed one at a time like any other message.

There are only three reasons to persist data in Falcon: Recovery, Regulatory and Surveillance (by the operations staff). Some of this data needs to be transactionally written to disk in-line. This means the Match Server must delay sending out responses while the transaction completes.

Additionally, one or more logs of business specific data and system specific data are maintained. These logs are not transactional and reside on the local disk. The business specific Log contains all business information that Falcon generates, while the System Log contains Falcon technical information which is more suited for system administrators.

As described, the Falcon architecture will consist of a primary server 602A (instance) and an actively running backup server 602B (instance). The backup 602B will have the ability to replicate the primary's state exactly, and failover with no apparent interruption of service in a reasonably quick amount of time.

The maximum delay it should take for the backup to failover is 7-10 seconds. Quicker times may be attainable, but this likely is a decision based on finding the optimal setting that prevents false positive failure detection. The failover time will be a configurable parameter.

The system should never send duplicate messages without marking them as possible duplicates. The system should limit the number of outgoing messages that are marked possible duplicate. The system will only send possible duplicates when caused by failover—during normal operation none will be generated.

Falcon Fault Tolerance is based on a concept called Active/Copycat as has been described above. In this system, both the Backup 602B and Primary 602A listen for INPUT messages from the Order Entry bus 606. In one embodiment, the order entry bus 606 is a logical component and there may be multiple order entry busses 606. In addition, the Backup 602B listens for RESPONSE messages from the primary 602A. When a RESPONSE for a given INPUT and a response for a subsequently received input are received, the Backup 602B then copies the Primary 602A by processing the same INPUT and compares the Primary RESPONSE to its own OUTPUT. The Backup server 602B performs the same actions as the Primary server, with the exception of publishing OUTPUT messages and writing to the database 604. In order for Active/CopyCat to work, the following requirements on the messaging infrastructure do exist:

All messages sent by Falcon will be uniquely identified by sender and a monotonically increasing sequence number (per sender, Falcon server). This is the Event Sequence Number and is unique to the Falcon instance.

All INPUT messages must be uniquely identified.

All OUTPUT messages published by Falcon Primary 602A will have an indication of what message it was in response to. Thus the Backup 602B can identify the INPUT message which caused the response.

All OUTPUT messages published by Falcon Primary 602A will have an indication of what input message was processed PREVIOUS to the input message that resulted in the current output (For example, all responses to input message 2 will have message 1 in the previous field).

In primary mode, no fault tolerance specific classes are used. The primary 602A is unaware whether a backup 602B exists or not—there is no requirement that a backup 602B need to be run at all, and the backup is a passive listener on traffic that would be sent in any case. As a result, the described implementation of fault tolerance has no performance impact on the primary running instance.

In the backup 602B, the actual CopyCat logic checking is done by Fault Tolerant ("FT") Message Managers. These objects allow the business logic components of the system (Gateway, Market Data, and Match Server) to be mostly ignorant of their primary/backup status. Gateway and Market data need to be aware of their status only at startup, so that they can instantiate the correct FT Message Manager. The Match Server needs to be aware of status to enable/disable writing to the database. Regardless of status, each component sends and receives messages as normal; it is the responsibility that component's FT Message Manager to sequence inbound messages and suppress output messages in backup mode.

The FT Message Managers are controlled by FT Policy objects, one for Order Entry and one for Market Data.

The following parameters are configurable in the present embodiment:

FaultToleranceFailureTimeout—How long should the backup wait before failing over in the event that failover conditions exist.

FaultToleranceInputMessageExpiration—How old should a message be before it should not result in failover? These messages will not be forwarded to the engine in case of failover.

FaultToleranceMMReceiveTopic—Topic to receive FT pong on.

FaultToleranceMMSendTopic—Topic to send FT ping on. If null/blank, ping is assumed to be successful FaultToleranceHeartbeatInterval—How long should the backup wait during periods of inactivity before generating an input and sending it to the primary to determine if it is still alive.

The order entry fault tolerant policy object is responsible for reordering input messages to ensure that they are processed in the same order as the primary 602A. It also does verification that primary output matches backup output, and initiates failover if necessary. All sources of input for the backup falcon 602B send their messages to the order entry FT policy. This includes the admin server, other order entry gateways, and internal Falcon timer events. As a result, all input events can be reordered to the same sequence processed by the primary.

Message flow during normal operation is as follows:
1. A message is received from a sender and placed in the input queue.
2. One or more output messages are received from the primary Falcon instance 602A in response to the input message.
3. One output messages for the next input message is received from the primary Falcon instance 602A.
4. Since that message indicates that the primary 602A has successfully processed the previous input message, the prior input is forwarded to the backup server 602B for processing.

Failover is initiated when all of the following cases are true:
No primary 602A responses have been received for the failure timeout.—This indicates that the primary 602A is not talking to the backup 602B.
There is at least one input which has not been responded to by the primary 602A. This indicates that there is a message that requires the primary 602A to respond.
That input is no older than a configurable number of seconds. This ensures that a single output dropped by a working primary 602A in a busy market will not cause failover much later in the day, as long as the primary 602A is processing messages.
That input was received at least one failure timeout after the backup 602B first heard from the primary. This ensures that a message received by the backup 602B while the primary is being started will not cause failover.
When the failure timeout has half expired, and all of the above conditions are true, the backup will initiate a ping, such as to the Admin Server and/or other order entry gateways, to ensure its network connectivity. Once the entire failure timeout expires, if that ping was successful, the backup 602B will initiate failover. If the ping was unsuccessful, the backup will enter a state where it is unable to take over for the primary 602A going forward.

The backup 602B compares output it produces with responses received by the primary 602A. If the comparison fails, the backup 602B will enter a state where it is unable to take over for the primary 602A going forward. All FIX message fields except for timestamp and checksum fields are hashed by both the primary 602A and backup 602B, and those hashes are compared. If there is any difference in the messages the backup 602B will note it and not attempt to take over for the primary 602A going forward. All important events are logged at an appropriate log level.

In order to detect failures during periods of low market activity, if the backup 602B has not heard from the primary 602A for a configurable period, such as 10*the failure timeout, it will generate an input message. The input message is sent to both the primary 602A and backup 602B in the same manner as any input from a user. The input message has no effect on the engine, but generates an output message from the primary 602A which is read and processed by the backup 602B. The net effect is that the backup 602B will discover any failures with the primary in a reasonable timeframe, without having to wait for a user input to trigger failover.

The disclosed match engine allows for order book migration—the process of copying an order book from a running primary server 602A to a newly started backup 602B without halting the primary. Book migration is used whenever a backup server 602B starts up—whether there is a working book to migrate or not. If there is no primary server 602A up, the backup 602B will wait until one exists to fully start.

It will be appreciated that the disclosed embodiments support any number of backup instances 540 running at the same time, any one of which may used in case a failure occurs. In addition, additional backup instances 540 may be utilized for other purposes such as to provide auditing, e.g. real time auditing of trader behavior, or testing environments, or to enable surveillance, without impacting the primary instance 502. For these instances 540 which are not relied upon for the purpose of backing up the primary instance 502, i.e. non-takeover backups, the requirement of always being one message behind may be relaxed. While the main backup instance 540 must remain a message behind since it has to be able to re-process a failed message that may have resulted in partial output, the other backup instances 540 used for alternative purposes don't necessarily need to reprocess that failed message—they only need to process messages in the same order received by the primary, i.e. they do not need to know that the primary completed processing the failed message, only that it started to process it.

When a backup 602B starts up, it gets its configuration from the Falcon Admin Server. It then sends a message to the primary server 602A to check if it is alive and waits for a response. There are two possible situations—if the primary 602A is up, it will respond right away. If not, as part of the startup behavior the primary 602A sends a message on startup. This message will be treated as a response, and the backup 602B will know that the primary 602A is up.

Once the primary 602A confirmation message has been received, the backup 602B checks to see how much time has elapsed since it received its configuration file from the FAS. If more than three seconds has elapsed, the backup reacquires the configuration from the FAS. This helps minimize the risk that the FAS makes a change to engine configuration after the backup 602B downloaded its configuration file, but before the primary 602A downloaded its configuration file. Should this happen, the backup 602B will detect this at startup and immediately fail. Thus, reacquiring the configuration file minimizes the cases of intentional "fast fail."

Following this process the backup sends a state request message to the primary 602A. The primary 602A responds with a state aggregate response, which contains all the mutable state—database sequence numbers, outstanding orders, host order numbers ("HON's"), host trade numbers ("HTN's"), etc. The backup 602B receives and applies this information, and is then ready to perform as a backup. In order to fully eliminate the risk of an admin server change not being applied during this process, the backup 602B compares the last sequence numbers received by the primary from the FAS to those it received from the FAS in the configuration object. There is an extremely small risk of the sequence numbers differing, but when they do it indicates that there was a user initiated configuration change from the admin server in the few seconds between receipt of the configuration and receipt of the aggregate state. If this condition is detected, the backup 602B shuts down and must be restarted to attempt book migration again—it does not indicate a persistent error condition (referred to as a "fast fail" above).

Once up, the backup 602B will queue input from all sources (other order entry gateways Admin server, internal timer events), but will not attempt to detect primary 602A failure until one failure timeout has elapsed after receipt of the first primary response message. No message received before that time can cause failover.

Primary 602A startup is fairly simple. The primary 602A downloads its configuration from the Falcon Admin Server, and sends a message on the shared engine bus to determine if there are any other primary engines out there. If it receives a response, it shuts down. If not, it starts up normally and sends out a message indicating that it has started.

The market data fault tolerant policy has no role other than to suppress the output of market data messages from the backup 602B. It does not do validation or checking, nor does it subscribe to the market data feed from the primary 602A. All important events are logged at an appropriate log level.

The Verify-Failover-Conditions Process performs the following functions:
1) Wait ½ of the failover timeout. If appropriate RESPONSE messages from the Primary 602A arrive during this time, then no failover is required.
2) Send a "ping" message to the other order entry gateways over the Order Entry 606 bus and listen for replies.
3) Wait ½ of the failover timeout. If appropriate RESPONSE messages from the Primary 602A arrive during this time, then no failover is required.
4) If a ping reply has been received over the Order Entry bus 606, then the Backup 602A can failover. If not, then the Backup 602A does not failover and instead sends an alert out to surveillance.

The Switch-to-Primary-Mode Process performs the following functions:
1) Backup locks primary 602A out of the database. This is achieved by entering "blocking" values in the MSG_SEQ_TABLE. When the primary 602A attempts to write these values, it interprets the resulting constraint violation as a backup 602b taking over (refer to FIGS. 10A and 10B).
2) Backup 602b sends "Primary cease" message to the Falcon Admin Server.
3) The Falcon Admin Server sends a "Primary cease" message to the failing Primary 602A using a messaging protocol such as Tibco, a messaging protocol promulgated by Tibco, Inc., located in Palo Alto, Calif.

4) Primary 602A goes silent

5) Backup 602B assesses Primary's 602A state, to duplicate whatever ordering the Primary 602A left off with. This is done by querying the database using the last forwarded input message as a key—the database will return the order of any subsequent messages written by the primary 602A. In embodiments implementing temporal based input processing, the Backup 602B will also require the processing times/timestamps of the processed inputs in order to fully replicate the state of the Primary 602A.

6) Backup 602B takes over as Primary 602A.

7) Backup 602B forwards the input messages in to the match server in the same order that the primary 602A processed them. If it has not yet received an input, it will wait for it. Outputs resulting from these messages will be sent as possible duplicate ("posdup"). If a message, that was not written by the Primary 602A, is older than the message timeout parameter, it will NOT be forwarded into the match server. Instead, it will be discarded and a message to that effect will be logged.

8) Backup 602B now acts as primary 602A, sending all input messages in to the primary 602A and sending output to both the market data and order entry buses 606.

The following failure cases are detected:

1. The primary 602A has failed and is not sending messages. In this case, partial or no output will be received for a particular input message, and no output will be received for subsequent input messages. In this case, once the backup 602B has verified that it is still connected, and that the failure lies with the primary 602A, it will initiate the failover process.
Result: FAILOVER 2. A bus or network problem occurs, preventing the primary 602A from receiving input or sending output. In this case, the primary 602A will be unable to communicate and failover will proceed as above.
Result: FAILOVER 3. The primary 602A has discovered a problem with its network interfaces, database 604, or hardware. In this case, the primary 602A will go silent and failover will proceed as above.
Result: FAILOVER 4. Operations staff initiates failover from the Falcon Admin server. In this case, failover will occur immediately, without the need to wait a failover timeout.
Result: FAILOVER 5. Network conditions cause the primary 602A to not receive an input message. In this case, the backup 602B will receive an input message, but the timeout will expire without it receiving any responses from the primary 602A relating to that message. In a busy market, as long as the primary 602A is sending responses, this will not initiate failover. In a quiet market, it will.
Result: FAILOVER or NORMAL 6. Network conditions cause partial loss of response messages for a given input between the primary 602A and backup 602B. In this case, some (but not all) output messages for a given input message are received, and at least one response for subsequent input is received. The backup 602B can determine the sequence of messages processed by the primary 602A by using a combination of the in-response-to and previous fields. The disparity in output will be noted by the FT Message Managers.
Result: NORMAL 7. A bus or network problem occurs, preventing the backup 602B from receiving input or primary 602A responses. In this case, the backup 602B will attempt the ping at ½ the failover time. The ping will fail, and the backup 602B will not attempt to take over.
Result: BACKUP HALTS. RESTARTED OR NEW BACKUP STARTED.

8. Network conditions cause total loss of response messages for a given input between the primary 602A and backup 602B, assuming there was more than one response message sent. In this case, all output messages for a given input message are dropped between the primary 602A and the backup 602B, and at least one response for subsequent input is received. Even using the previous message indicator the backup 602B cannot know how many input messages were processed by the primary in during the gap in output messages. As a result, it can no longer ensure that it is processing messages in the same sequence as the primary 602A.
Result: BACKUP MUST BE HALTED. RESTARTED OR NEW BACKUP STARTED.

9. Network conditions cause the backup 602B to not receive an input message. In this case, the backup 602B will receive a message in response to an input message that it has not received.
Result: BACKUP MUST BE HALTED. RESTARTED OR NEW BACKUP STARTED.

10. The output messages from the primary 602A and backup 602B differ. In this case, either the primary has generated more response messages than the backup, or the content differs. The error will be logged and reported at high priority, and the backup will no longer act as a backup.
Result: BACKUP HALTS. RESTARTED OR NEW BACKUP STARTED.

11. Database error, recoverable in under FAILURE_TIMEOUT. Backup 602B may prepare for failover, but primary 602A will be able to write before backup 602B finishes taking over.
Result: NORMAL 12. Database error, not recoverable in under FAILURE_TIMEOUT. Primary 602A will be unresponsive for the failure timeout, and backup 602B will attempt to take over. Backup 602B will be unable to take over immediately, but as soon as database is recovered backup will lock primary 602A out and assume primary 602A roles.
Result: FAILOVER.

In another embodiment, mechanisms are provided to handle a failed database 506 and to prevent such a failure from causing the fault tolerant mechanisms described herein from failing over from a fully functional primary instance 502. The database 506 itself may represent a single point of failure or delay (e.g., in one embodiment, the database 506 is implemented using an Oracle RAC which occasionally may delay transactions for many seconds while it reconfigures after an internal failure). As shown in FIG. 5, a database switch mechanism 544 is provided. In operation, if the primary instance 502 determines that it has not had a response from the database in X seconds, the exact value of which is implementation dependent, it realizes that the backup instance 504 may be about to take over, even though the primary instance 502 is perfectly healthy. The primary instance 502 may then initiate a conversation with the backup instance 504 and coordinate a switch to a standby database 542. This switch is done without market interruption and must be coordinated with the failover process, since during a database switch, failover must be disabled since the database is the arbiter of which instance is the primary instance. Once database switch is completed failover is re-enabled.

Figure 9:
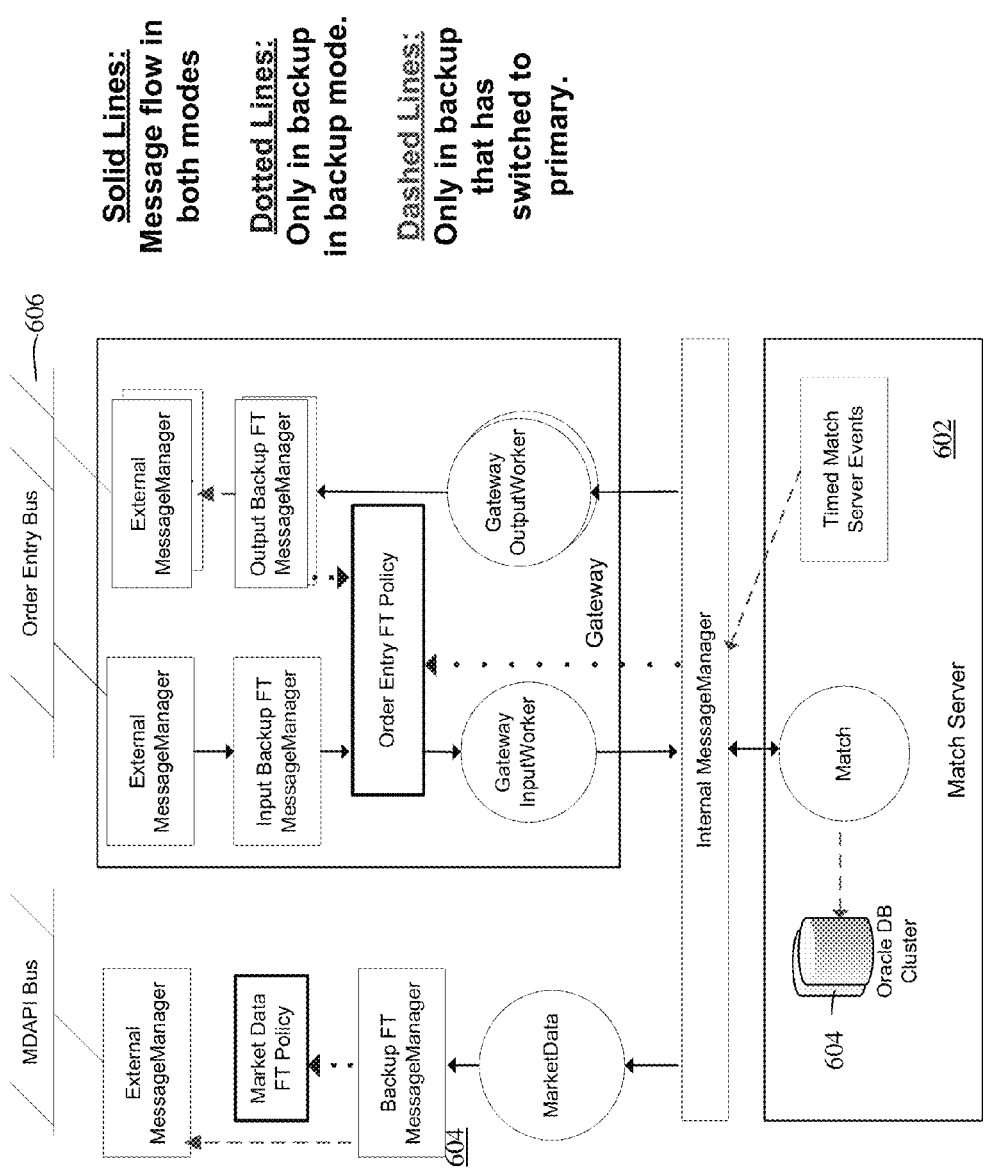
FIG. 9 depicts a more detailed block diagram demonstrating operation of the fault tolerant system of FIG. 6.

FIG. 9 depicts a more detailed block diagram demonstrating operation of the fault tolerant system of FIG. 6.

The backup 602B locks out the primary 602A, and thereby prevents a "run-away primary," by writing "blocking" data to the message sequence table. Because the primary 602A cannot send out a message until the input associated with that message is persisted, the backup 602B knows that only messages written prior to the blocking data can be sent by the primary 602A.

Figure 10:
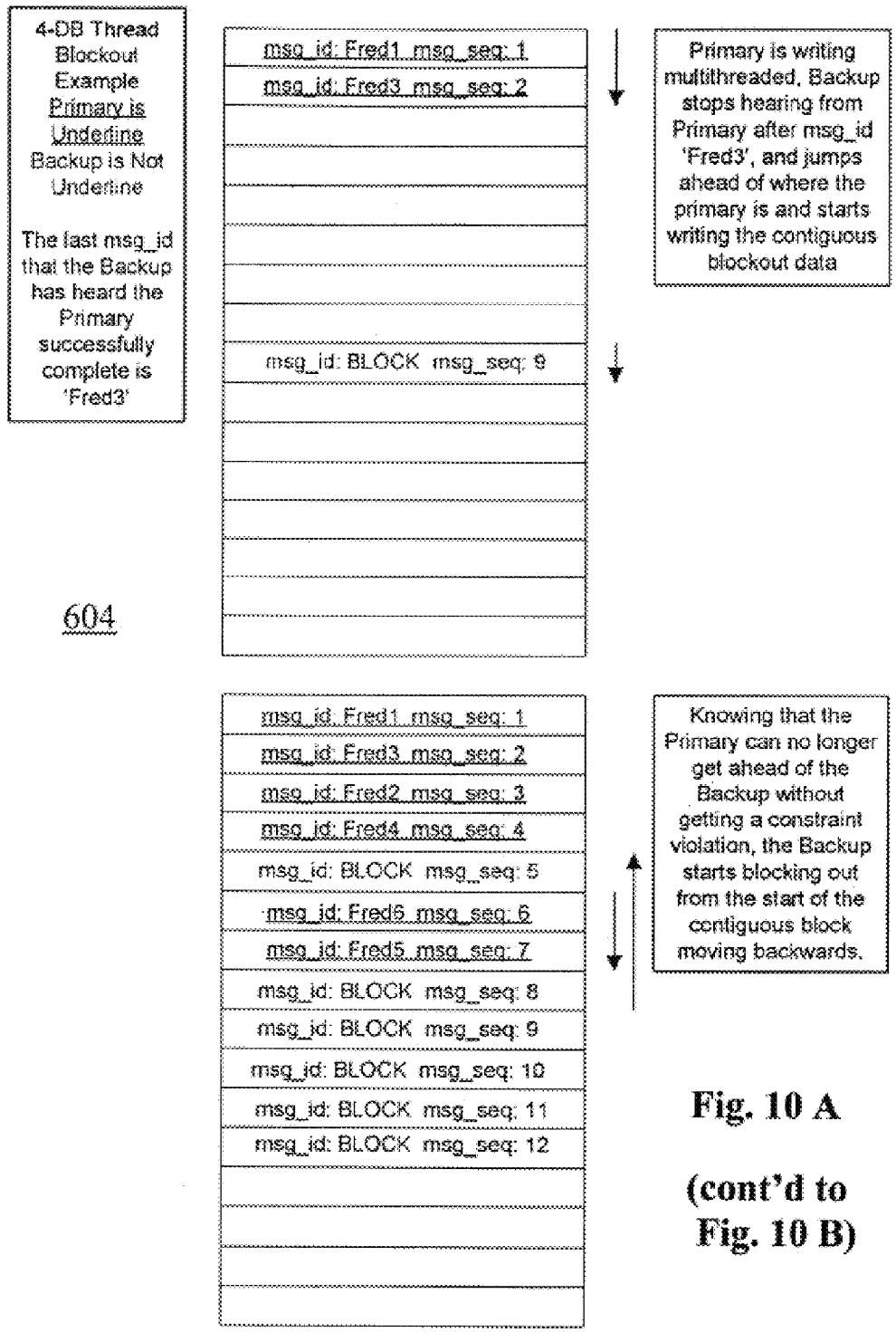
FIGS. 10A and 10B depict exemplary operation of a database for use with the fault tolerant system of FIG. 6.
Figure 10:
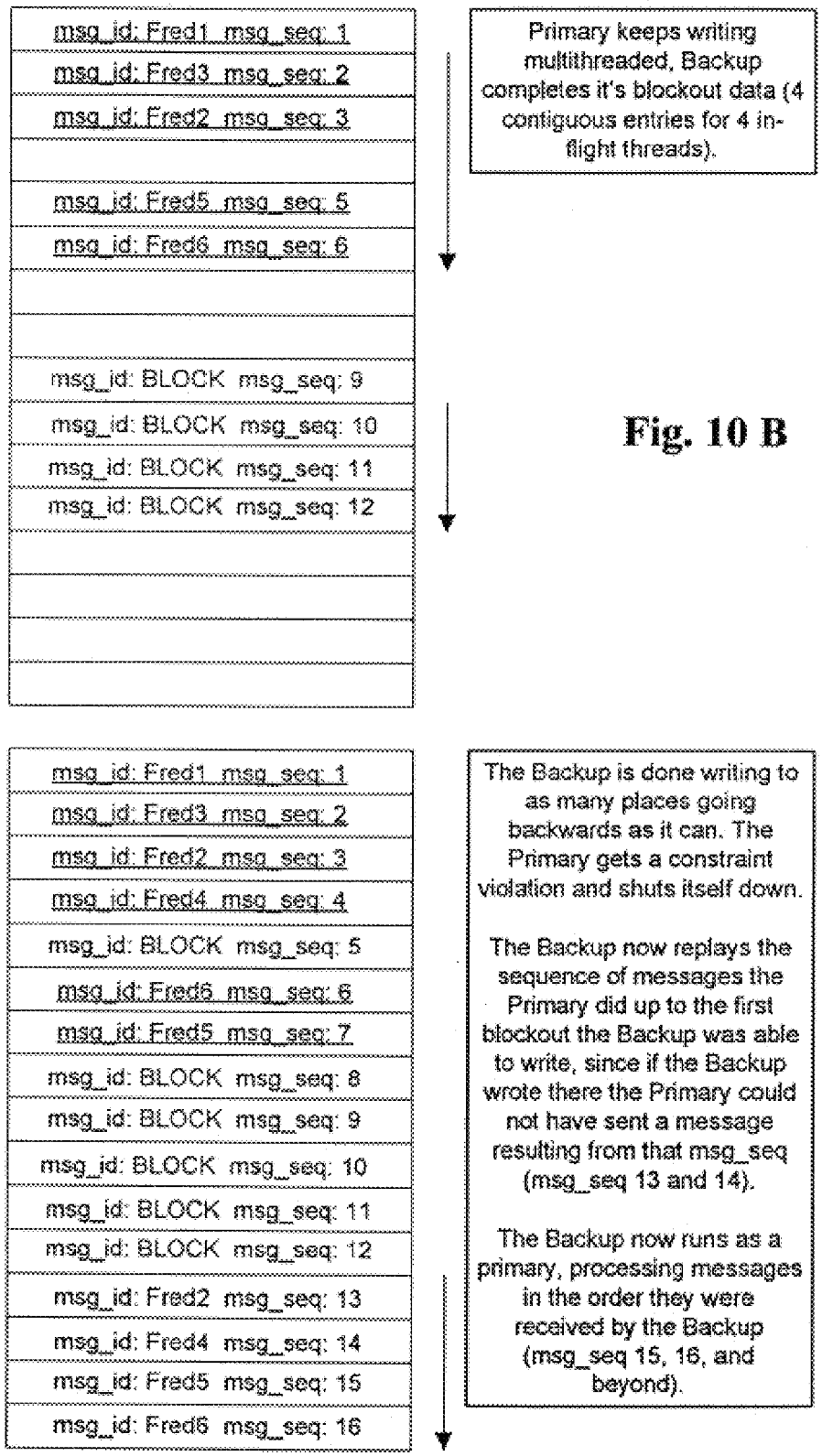

FIGS. 10A and 10B depict exemplary operation of a database 604 for use with the fault tolerant system of FIG. 6.

Figure 11:
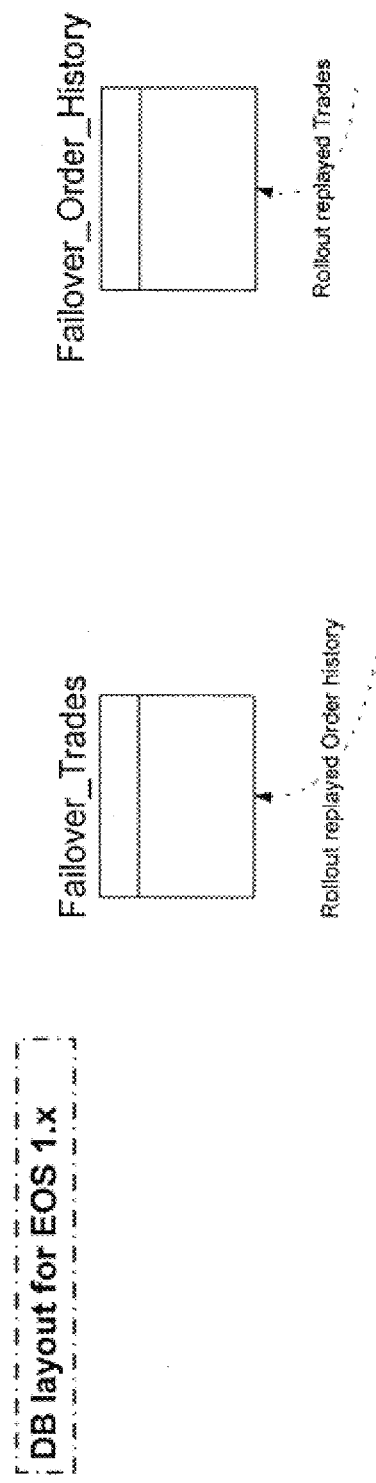
FIGS. 11A, 11B, and 11C depict exemplary data structures utilized by the fault tolerant system of FIG. 6.
Figure 11:
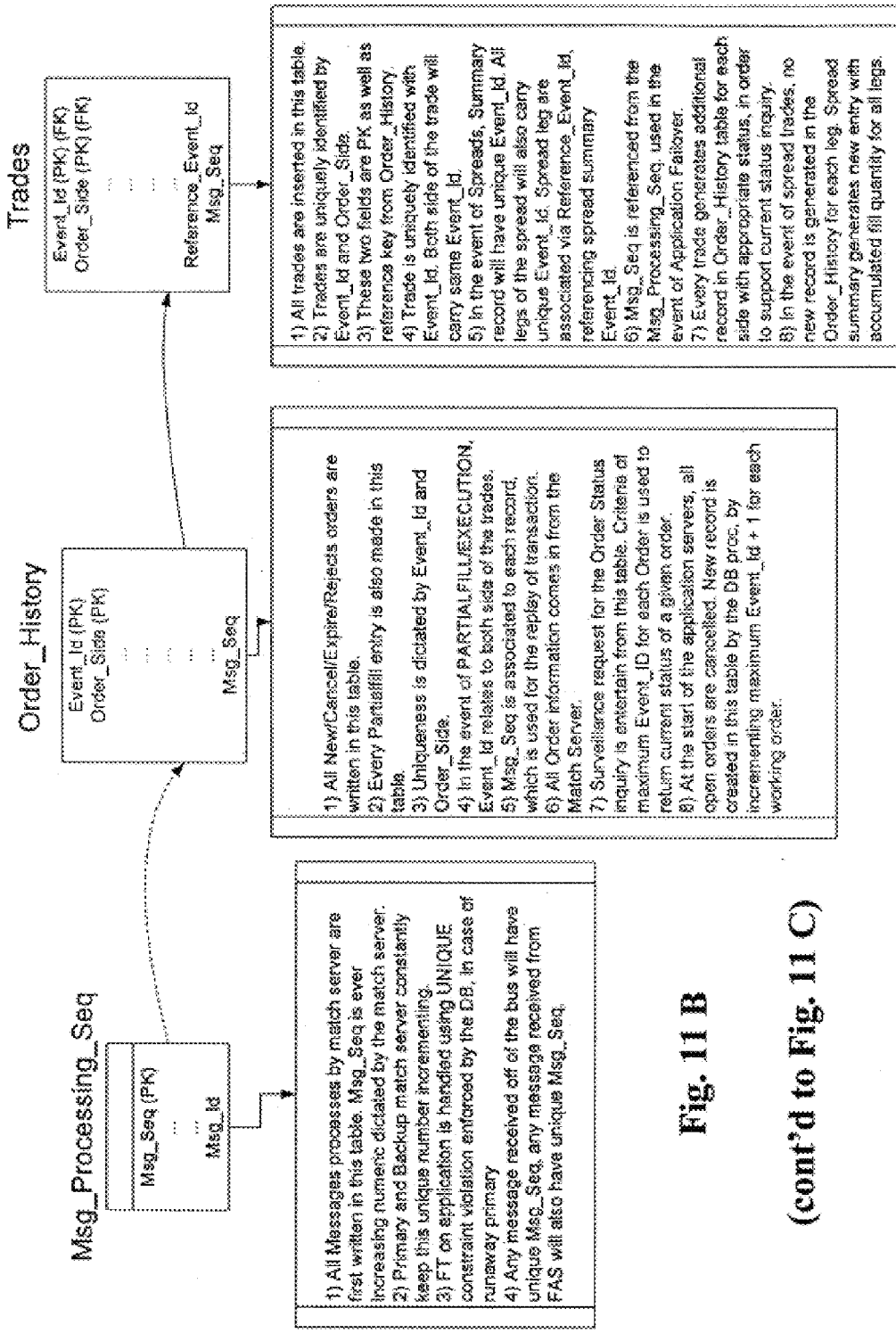
Figure 11:
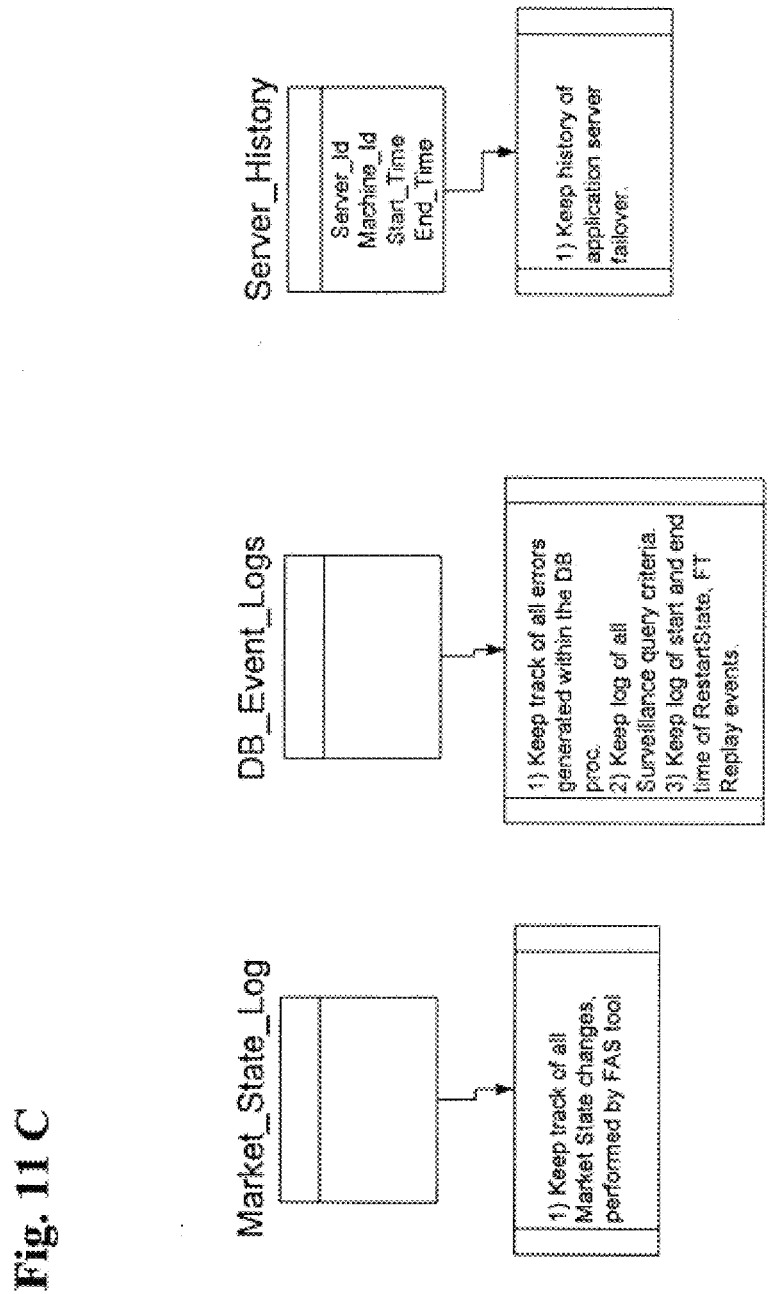

FIGS. 11A, 11B, and 11C depict exemplary data structures utilized by the fault tolerant system of FIG. 6 to provide order history and trade data integrity data.

After the backup 602B which is taking over marks that it is now the primary 602A in the database, it then asks the database for any Input Message Identifiers that the backup may have missed the primary processing (by stating the last Input ID that it saw). The backup 602B will then run those Inputs in the same sequence as the primary 602A processed them. The database procedure will move those entries from the Order History table to another 'Failover Order History' table, and from the Trades table to another 'Failover Trades' table, since the database knows that all orders entered after the Input ID that the backup asks about are invalid (and will be replayed by the backup that is taking over). In this way the Order History and Trades tables are kept consistent for inquiries, while still having a complete record of what occurred.

Re-play of data during Application Failover
Backup engine processes messages in the same order as primary.
In the event of failover, Backup identifies last known message. Message is identified by MSG_SEQ, which is tagged to every inbound record in Orders and Trades table.
DB picks up all Orders and Trade data written by Primary after the last known message.
Move data out of ORDERS and TRADES table into failover tables.
No data is lost as primary data is moved to failover tables.
Useful for:
Verification of backup engine processing
Settlement of disputes
Fulfill regulatory needs
No updates required as backup (now primary) strictly does inserts of re-play data.
FAS always get consistent view of the information i. EXAMPLE Message Sequence

| Msg Seq | Msg Type | Server Id | Machine ID |
|---------|----------|-----------|------------|
| 117630  | FIX      | FAQAAPF3  | FAQAAPF3   |
| 117631  | FIX      | FAQAAPF3  | FAQAAPF3   |
| 117632  | MATCH    | FAQAAPF3  | FAQAAPF2   |
| 117633  | MATCH    | FAQAAPF3  | FAQAAPF2   |
| 117634  | MATCH    | FAQAAPF3  | FAQAAPF2   |
| 117762  | FIX      | FAQAAPF3  | FAQAAPF2   |
| 117763  | FIX      | FAQAAPF3  | FAQAAPF2   |

Failover Order History

| Order ID | HON    | Event ID | Msg Seq | Machine ID | Server ID | Order Qty | Status  |
|----------|--------|----------|---------|------------|-----------|-----------|---------|
| 112883   | 112883 | 165532   | 117630  | FAQAAPF3   | FAQAAPF3  | 1         | WORKING |
| 112884   | 112884 | 165533   | 117631  | FAQAAPF3   | FAQAAPF3  | 1         | WORKING |

Order History

| Order ID | HON    | Event ID | Msg Seq | Machine ID | Server ID | Order Qty | Status  |
|----------|--------|----------|---------|------------|-----------|-----------|---------|
| 112883   | 112883 | 165532   | 117762  | FAQAAPF2   | FAQAAPF3  | 1         | WORKING |
| 112884   | 112884 | 165533   | 117763  | FAQAAPF2   | FAQAAPF3  | 1         | WORKING |

For example:
Input 1, 2, 5, 3, 4, 6 are received by the Primary.
Input 2, 1, 5, 4, 6, 3 are received by the Backup.
Primary processes input 1, 2, 5, 3, 4, and writes in it's database.
Backup receives primary's output for 1, 2, 5. Backup processes these.
Backup then receives nothing for more than the timeout period due to primary NIC failure.
Backup decides to take over.
Backup blocks out primary from the database.
Backup requests the input the Primary processed after input 5.
Database moves data resulting from input 3 and 4 from the Order History table to the Order Overlap table, and from Trades to Trades Overlap table.
Database returns input id's 3 and 4.
Backup-now-Primary processes 3 and 4 as a primary, writes data to database
Backup-now-Primary sends out messages for 3 and 4 as pos-dup.
Backup-now-Primary now processes 6 as a primary.

It is therefore intended that the foregoing detailed description be regarded as illustrative rather than limiting, and that it be understood that it is the following claims, including all equivalents, that are intended to define the spirit and scope of this invention.

We claim:

1. A method for providing fault tolerance in a system that comprises a primary match server, the method comprising:

attributing a cause for an incomplete database operation to a failure in a database coupled to the primary match server; and switching from the failed database to a standby database without preventing the primary match server from completing the database operation.

2. The method of claim 1 wherein the failure in the database is identified as a result of the primary match server not having received a response from the database in a preset period of time.

3. The method of claim 1 further comprising providing a first backup match server operative to process a first copy of a first transaction received by the primary match server after the primary match server has generated a first primary result, and to generate a first backup result based thereon.

4. The method of claim 3 further comprising coordinating the switching from the failed database to the standby database through communication between the first match server and the first backup match server.

5. The method of claim 3, wherein the first transaction comprises an incoming trade order, an order cancellation, or a combination thereof.

6. The method of claim 3 wherein the first primary result is selected from the group consisting of an order cancellation confirmation, an order confirmation, a trade execution confirmation, an order elimination, an order rejection, and combinations thereof.

7. The method of claim 1 further comprising determining, subsequent to the primary match server's receipt of a first transaction, that the primary match server is unlikely to generate a first primary result and, based thereon, preventing the primary match server from completing the database operation.

8. The method of claim 7 wherein the determining further comprises determining, prior to the preventing, that the primary match server is unlikely to generate the first primary result because the completion of the database operation is impeded and, based thereon, alternatively completing the database operation.

9. The method of claim 7 wherein the preventing further comprises causing the primary match server to self terminate.

10. The method of claim 1, wherein the primary match server comprises a software application, a processor, or a combination thereof.

11. The method of claim 1 wherein the primary match server comprises a match server of a financial exchange.

12. The method of claim 1 further comprising:
providing a backup match server, duplicative of the primary match server, configured to perform each of a sequence of operations to be performed by the primary match server as each operation is successfully completed by the primary match server or after determination that the primary match server will not successfully do so; and based on the determination that at least one of the sequence of operations is not likely to be completed, preventing the primary match server from completing the at least one of the sequence of operations by causing a database to return a constraint violation in response to a store transaction by the primary match server to prevent completion thereof.

13. A system for providing fault tolerance to a primary match server, the system comprising:
a primary match server operative to process a first transaction and generate a first primary result based thereon, the process being dependent upon completion of a database operation;

a database switch mechanism configured to switch from a failed database to a standby database without preventing the primary match server from completing the database operation, the switch being based on a determination that an incomplete database operation resulted from a failure of the database.

14. The system of claim 13 further comprising a fault detector coupled with the primary match server and operative to determine whether the incomplete database operation resulted from database failure.

15. The system of claim 14 wherein the fault detector is further operative to determine, subsequent to the primary match server's receipt of the first transaction, that the primary match server is unlikely to generate the first primary result and, based thereon, prevent the primary match server from completing the database operation.

16. The invention of claim 15 wherein the fault detector is further operative to determine, prior to the prevention, that the primary match server is unlikely to generate the first primary result because completion of the database operation is impeded and, based thereon, alternatively complete the database operation.

17. The system of claim 13, wherein the primary match server comprises a software application, a processor or a combination thereof.

18. The system of claim 13 further comprising a first backup match server operative to process a first copy of the first transaction received by the primary match server after the primary match server has generated the first primary result and generate a first backup result based thereon.

19. A system for providing fault tolerance to a primary match server, the system comprising:
a processor;
a non-transitory memory coupled to the processor;
first logic stored in the non-transitory memory and executable by the processor to attribute a cause for an incomplete database operation to a failure in a database coupled to the primary match server; and
second logic stored in the non-transitory memory and executable by the processor to switch from the failed database to a standby database without preventing the primary match server from completing the database operation.

20. A system for providing fault tolerance to a primary match server, the primary match server operative to process a first transaction and generate a first primary result based thereon, the process being dependent upon completion of a database operation by the primary match server, the system comprising:
means for attributing a cause for an incomplete database operation to a failure in a database coupled to the primary match server; and
means for switching from the failed database to a standby database without preventing the primary match server from completing the database operation.

* * * * *